(12) United States Patent
Haave et al.

(10) Patent No.: US 7,171,187 B2
(45) Date of Patent: Jan. 30, 2007

(54) METHOD AND SYSTEM FOR ASSET TRACKING

(75) Inventors: Luther Haave, Edmonton (CA); Ric Davies, Edmonton (CA); Kristoffer Haave, Edmonton (CA)

(73) Assignee: Longview Advantage, Inc, Calgary (CA)

( * ) Notice: Subject to any disclaimer, the term of this patent is extended or adjusted under 35 U.S.C. 154(b) by 300 days.

(21) Appl. No.: 10/222,979

(22) Filed: Aug. 19, 2002

(65) Prior Publication Data

US 2003/0050038 A1    Mar. 13, 2003

(30) Foreign Application Priority Data

Aug. 17, 2001    (CA) .................................... 2355426

(51) Int. Cl.
*H04M 11/00*    (2006.01)
*G08B 21/00*    (2006.01)

(52) U.S. Cl. .............. 455/404.02; 455/404.1; 455/456.1; 455/456.3; 455/550.1; 340/686.1; 370/338; 700/65; 707/24

(58) Field of Classification Search ............ 455/458.1, 455/404.1, 456.2, 456.3, 456.5, 456.6, 556.1, 455/404.2, 406–411, 414.1, 490, 457, 461, 455/414.2, 421, 418–420, 456.1, 424, 426, 455/440, 463, 12.1, 556.2, 557, 566–567, 455/569; 340/422, 989, 825.32, 686.1, 426, 340/505–506; 707/22, 24, 6, 117; 370/334–338; 700/65–66, 73
See application file for complete search history.

(56) References Cited

U.S. PATENT DOCUMENTS 5,043,736 A    8/1991    Darnell et al.
5,223,844 A    6/1993    Mansell et al.
5,225,842 A    7/1993    Brown et al.
5,365,450 A    11/1994    Schuchman et al.
5,389,934 A    2/1995    Kass
5,418,537 A    5/1995    Bird
5,422,813 A    6/1995    Schuchman et al.

(Continued)

FOREIGN PATENT DOCUMENTS

CA    1277400    12/1990

(Continued)

OTHER PUBLICATIONS

International Searching Authority, International Search Report for PCT/CA/02/01278, Dec. 12, 2002; 3 pages.

*Primary Examiner*—Pablo N. Tran
(74) *Attorney, Agent, or Firm*—Wong, Cabello, Lutsch, Rutherford & Brucculeri, LLP

(57) ABSTRACT

An asset tracking and panic alarm system includes: a tracking device for mounting in an asset; a panic alarm pendant for carrying by a person; a RF receiver module for mounting in the asset for receiving a panic alarm signal from the pendant; and, a server coupled to a cellular telephone network and to a client terminal; the server including means for receiving the panic alarm indication and GPS information from the tracking device via the cellular telephone network; the server including means for determining a location of the asset from the GPS information: the client terminal for displaying the panic alarm indication and the location to a user, thereby notifying the user that the person has activated the panic alarm switch within a predetermined radius from the asset.

38 Claims, 24 Drawing Sheets

U.S. PATENT DOCUMENTS

| | | |
|---|---|---|
| 5,448,773 A | 9/1995 | McBurney et al. |
| 5,491,486 A | 2/1996 | Welles, II et al. |
| 5,512,902 A | 4/1996 | Guthrie et al. |
| 5,515,043 A | 5/1996 | Berard et al. |
| 5,526,401 A | 6/1996 | Roach, Jr. et al. |
| 5,544,225 A | 8/1996 | Kennedy, III et al. |
| 5,546,444 A | 8/1996 | Roach, Jr. et al. |
| 5,550,551 A | 8/1996 | Alesio |
| 5,557,254 A | 9/1996 | Johnson et al. |
| 5,559,520 A | 9/1996 | Barzegar et al. |
| 5,572,204 A | 11/1996 | Timm et al. |
| 5,592,173 A | 1/1997 | Lau et al. |
| 5,594,740 A | 1/1997 | LaDue |
| 5,608,410 A | 3/1997 | Stilp et al. |
| 5,633,875 A | 5/1997 | Hershey et al. |
| 5,650,785 A | 7/1997 | Rodal |
| 5,663,734 A | 9/1997 | Krasner |
| 5,673,305 A | 9/1997 | Ross |
| 5,682,133 A | 10/1997 | Johnson et al. |
| 5,686,910 A | 11/1997 | Timm et al. |
| 5,703,598 A | 12/1997 | Emmons |
| 5,726,893 A | 3/1998 | Schuchman et al. |
| 5,736,962 A | 4/1998 | Tendler |
| 5,752,218 A | 5/1998 | Harrison et al. |
| 5,777,580 A | 7/1998 | Janky et al. |
| 5,781,156 A | 7/1998 | Krasner |
| 5,808,564 A | 9/1998 | Simms et al. ............... 340/990 |
| 5,835,377 A | 11/1998 | Bush |
| 5,845,203 A | 12/1998 | LaDue |
| 5,864,315 A | 1/1999 | Welles, II et al. |
| 5,874,914 A | 2/1999 | Krasner |
| 5,883,594 A | 3/1999 | Lau |
| 5,889,474 A | 3/1999 | LaDue |
| 5,890,061 A | 3/1999 | Timm et al. |
| 5,894,266 A * | 4/1999 | Wood et al. ........... 340/539.17 |
| 5,895,436 A | 4/1999 | Savoie et al. |
| 5,898,391 A | 4/1999 | Jefferies et al. |
| 5,914,675 A | 6/1999 | Tognazzini |
| 5,918,180 A | 6/1999 | Dimino |
| 5,918,183 A | 6/1999 | Janky et al. |
| 5,937,355 A | 8/1999 | Joong et al. |
| 5,969,595 A | 10/1999 | Schipper et al. |
| 5,999,808 A | 12/1999 | LaDue |
| 6,002,326 A | 12/1999 | Turner |
| 6,014,089 A | 1/2000 | Tracy et al. |
| 6,025,774 A | 2/2000 | Forbes |
| 6,028,883 A | 2/2000 | Tiemann et al. |
| 6,028,887 A | 2/2000 | Harrison et al. |
| 6,058,289 A | 5/2000 | Gardner et al. |
| 6,067,044 A | 5/2000 | Whelan et al. |
| 6,069,570 A | 5/2000 | Herring |
| 6,075,458 A | 6/2000 | Ladner et al. |
| 6,104,978 A | 8/2000 | Harrison et al. |
| 6,121,922 A | 9/2000 | Mohan |
| 6,131,067 A | 10/2000 | Girerd et al. |
| 6,140,956 A | 10/2000 | Hillman et al. |
| 6,147,601 A | 11/2000 | Sandelman et al. |
| 6,150,955 A | 11/2000 | Tracy et al. |
| 6,166,627 A | 12/2000 | Reeley |
| 6,185,198 B1 | 2/2001 | LaDue |
| 6,204,772 B1 * | 3/2001 | DeMay et al. ........... 340/686.1 |
| 6,249,217 B1 | 6/2001 | Forbes |
| 6,297,768 B1 | 10/2001 | Allen, Jr. |
| 6,476,763 B2 | 11/2002 | Allen, Jr. |
| 6,484,035 B2 | 11/2002 | Allen, Jr. |
| 6,505,086 B1 * | 1/2003 | Dodd et al. ................... 700/65 |
| 6,710,738 B2 | 3/2004 | Allen, Jr. |
| 6,774,840 B1 * | 8/2004 | Adamczyk et al. ...... 342/357.1 |
| 6,813,526 B1 * | 11/2004 | Dodd, Jr. ..................... 700/65 |
| 2003/0235172 A1 * | 12/2003 | Wood ........................ 370/338 |

FOREIGN PATENT DOCUMENTS

| | | |
|---|---|---|
| CA | 2049818 | 8/1991 |
| CA | 2133673 | 10/1994 |
| CA | 2228417 | 8/1995 |
| CA | 2240280 | 4/1996 |
| CA | 2249600 | 3/1997 |
| CA | 2259893 | 7/1997 |
| CA | 2275410 | 10/1997 |
| CA | 2295775 | 6/1998 |
| CA | 2332465 | 5/1999 |
| CA | 2185230 | 10/2000 |
| CA | 2370348 | 2/2002 |
| EP | 1 414 002 A1 | 4/2004 |

* cited by examiner

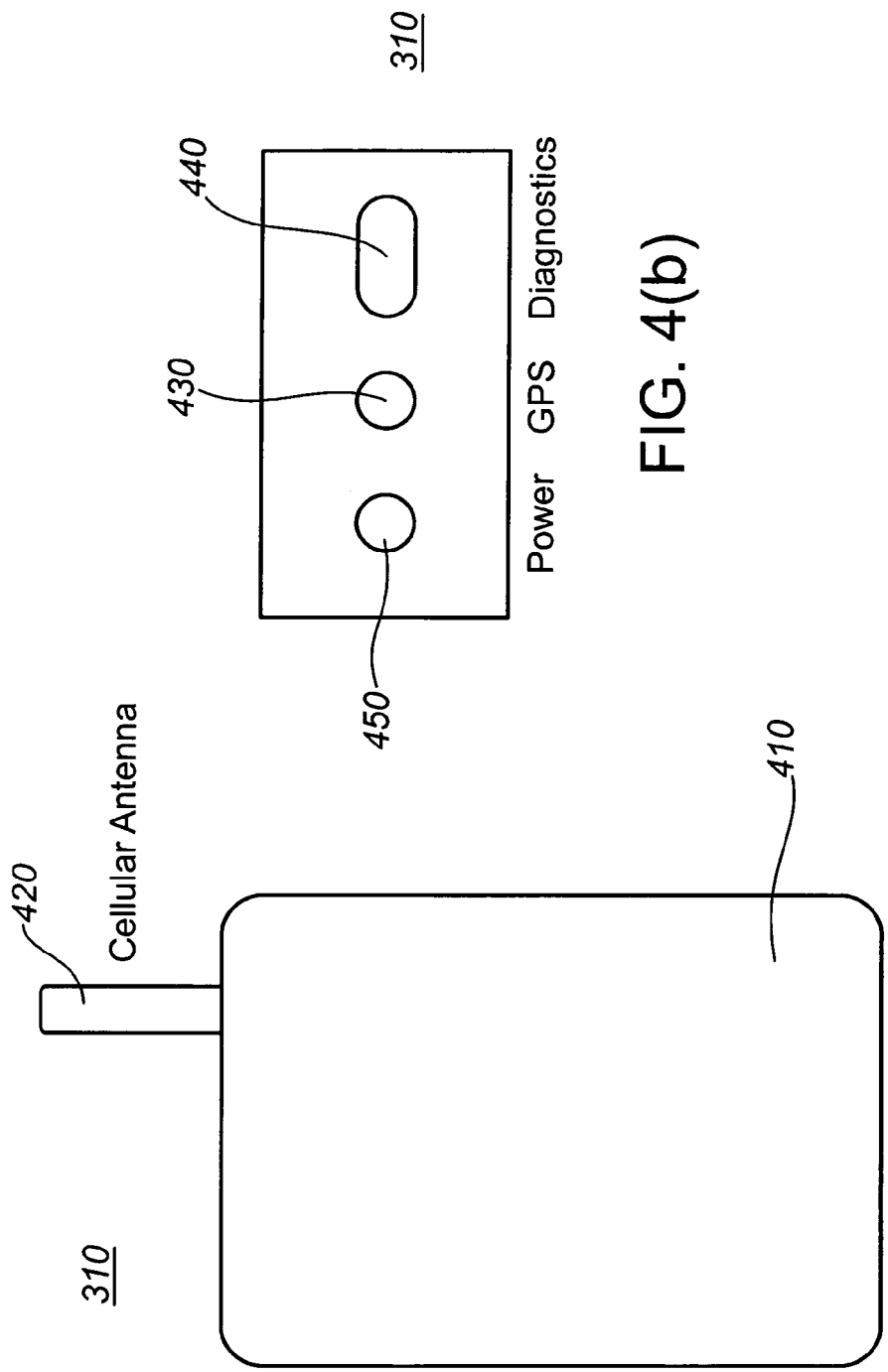

1. ENGLISH      505
    1. CUSTOMER LOGIN      510
        MANAGE OCCURRED ALARMS      515
            1. REPORT A THEFT      520
                SELECT A DEVICE
                    CONFIRM THEFT TO SERVICE PROVIDER
            2. LOCATE A TRACKING DEVICE      525
                SELECT A DEVICE
                    CONFIRM ACCEPTANCE OF CHARGE
                    PRESENTS MAP WITH ZOOM FUNCTIONALITY
            3. LAST KNOWN LOCATION      530
                SELECT A DEVICE
                    PRESENTS MAP WITH ZOOM FUNCTIONALITY
                    UPDATE LOCATION WHEN UNIT IS NEXT ON
                    CONFIRM ACCEPTANCE OF CHARGE
            4. TRACKING DEVICE SETTINGS      535
                SELECT A TRACKING DEVICE
                    1. CHANGE DEVICE SETTINGS
                        DISPLAYS CURRENT SETTINGS
                        SUBMIT CHANGES
                        ACCEPT CHARGE
                        COMPLETED
                    2. MOVE A DEVICE
                        ENTER NEW PROTECTED ASSET DATA
                        CONFIRM ACCEPTANCE OF "MOVE" CHARGE
                        COMPLETED
                    3. CHANGE PROTECTED ASSET DESCRIPTION
                        ENTER NEW PROTECTED ASSET DATA
                    4. ASSIGN DEVICE TO A GROUP
                        ASSIGN DEVICE TO EXISTING GROUP
                    5. POWER DOWN DEVICE
                    6. CONTACT US
                    7. PRIVACY STATEMENT
                    8. LOG OFF
                    9. HOME
            5. CUSTOMER/ USER SETTINGS      540
                1. CHANGE PASSWORD
                2. CHANGE CUSTOMER INFORMATION
                3. SET ALARM NOTIFICATIONS
                4. MANAGE OTHER USERS
                5. SETUP/ MANAGE GROUPS
                6. REVIEW RECEIVED ALARMS
                7. REVIEW LOCATION REPORTS
                8. REVIEW BILLING FILE
                9. CONTACT US
                10. PRIVACY STATEMENT
                11. LOG OFF
                12. HOME
            6. ADD A NEW TRACKING DEVICE      545
                ENTER S/N OF NEW DEVICE
                CONFIGURE THE DEVICE
                CONFIRM UNIT IS RESPONDING

|  |  |
|---|---|
| 7. CONTACT US | 550 |
| 8. PRIVACY STATEMENT | 555 |
| 9. LOG OFF | 560 |
| 10. TRACKING SERVICE PROVIDER FUNCTIONS | 565 |

1. REVIEW/ MANAGE CUSTOMER DATA
           SELECT CUSTOMER
                1. REVIEW/ EDIT PASSWORD DATA
                2. REVIEW/ EDIT CUSTOMER INFORMATION
                3. REVIEW/ EDIT GROUP INFORMATION
                4. REVIEW/ EDIT USER ACCESS PRIVILEGES
                5. REVIEW/ EDIT ALARM NOTIFICATIONS
                6. REVIEW/ EDIT RECEIVED ALARMS
                7. REVIEW/ EDIT STORED LOCATION DATA
                8. REVIEW BILLING DATA
                9. LOG OFF
                10. HOME
       2. REVIEW/ MANAGE DEVICE SETTINGS
           SELECT A TRACKING DEVICE
                1. CHANGE DEVICE SETTINGS
                      DISPLAYS CURRENT SETTINGS
                      SUBMIT CHANGES
                      ACCEPT CHARGE
                      COMPLETED
                2. MOVE A DEVICE
                      ENTER NEW PROTECTED ASSET DATA
                      CONFIRM ACCEPTANCE OF "MOVE" CHARGE
                      COMPLETED
                3. CHANGE PROTECTED ASSET DESCRIPTION
                      ENTER NEW PROTECTED ASSET DATA
                4. ASSIGN DEVICE TO A GROUP
                      ASSIGN DEVICE TO EXISTING GROUP
                5. POWER DOWN DEVICE
                6. ACTIVATE DEVICE
                7. CHANGE REPORT DAY
                8. CHANGE REPORT TIME
                9. WAKE UP AND LOCATE
                10. TRACK UNIT
                11. LOG OFF
                12. HOME

|  |  |
|---|---|
| 2. POLICE LOGIN | 570 |

ENTER TEMPORARY PASSWORD PROVIDED BY TRACKING SERVICE PROVIDER
       ENTER TRACKING SERVICE PROVIDER INCIDENT REPORT NUMBER
           1. LOCATE THIS DEVICE
           2. TRACK THIS DEVICE
           3. LOG OUT

|  |  |
|---|---|
| 3. OPEN NEW ACCOUNT | 575 |

SAVE DATA
       ADD A NEW TRACKING DEVICE

|  |  |
|---|---|
| 4. CONTACT US | 580 |
| 5. PRIVACY STATEMENT | 585 |
| 2. ESPANOL (All of the above pages are reproduced in Spanish) | 590 |
| 3. FRANCAIS (All of the above pages are reproduced in French) | 595 |

FIG. 5(b)

FIG. 6(c)
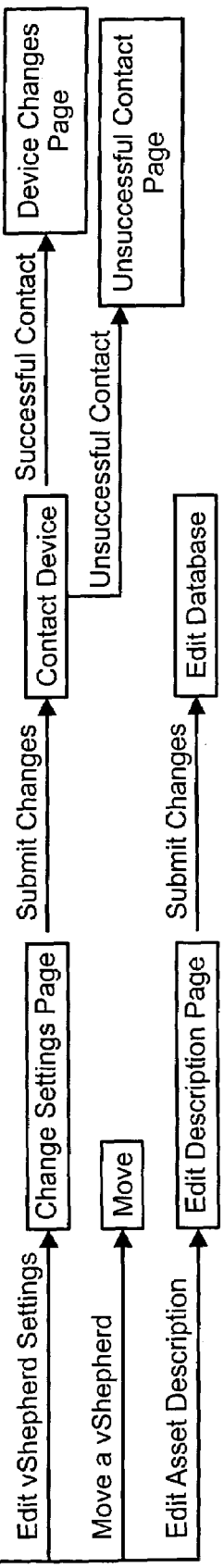
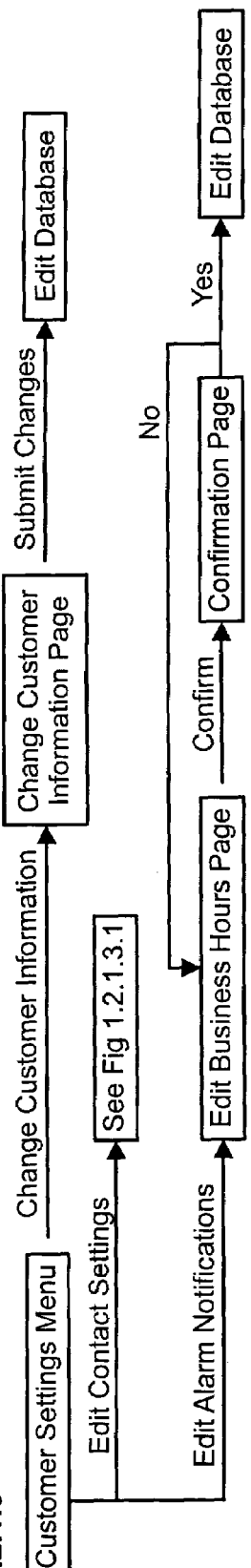
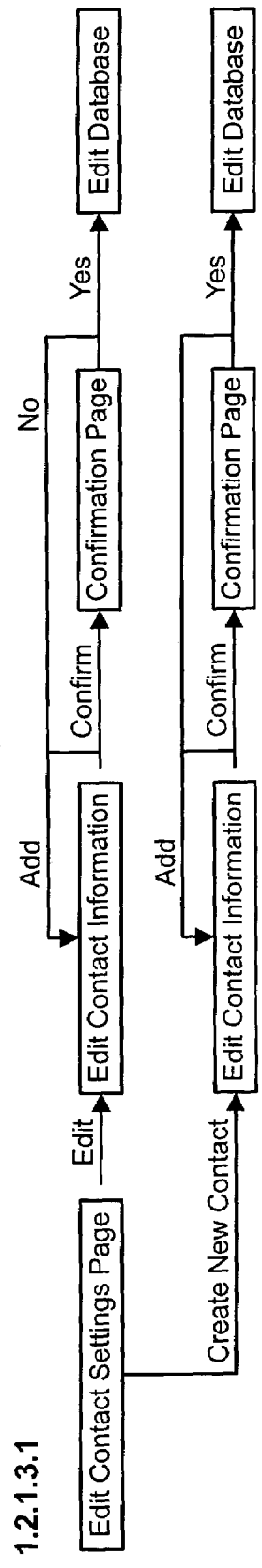

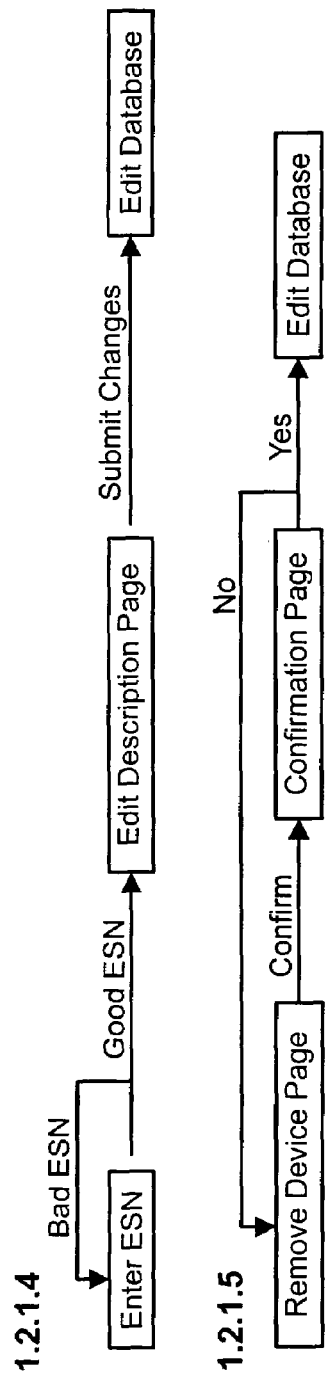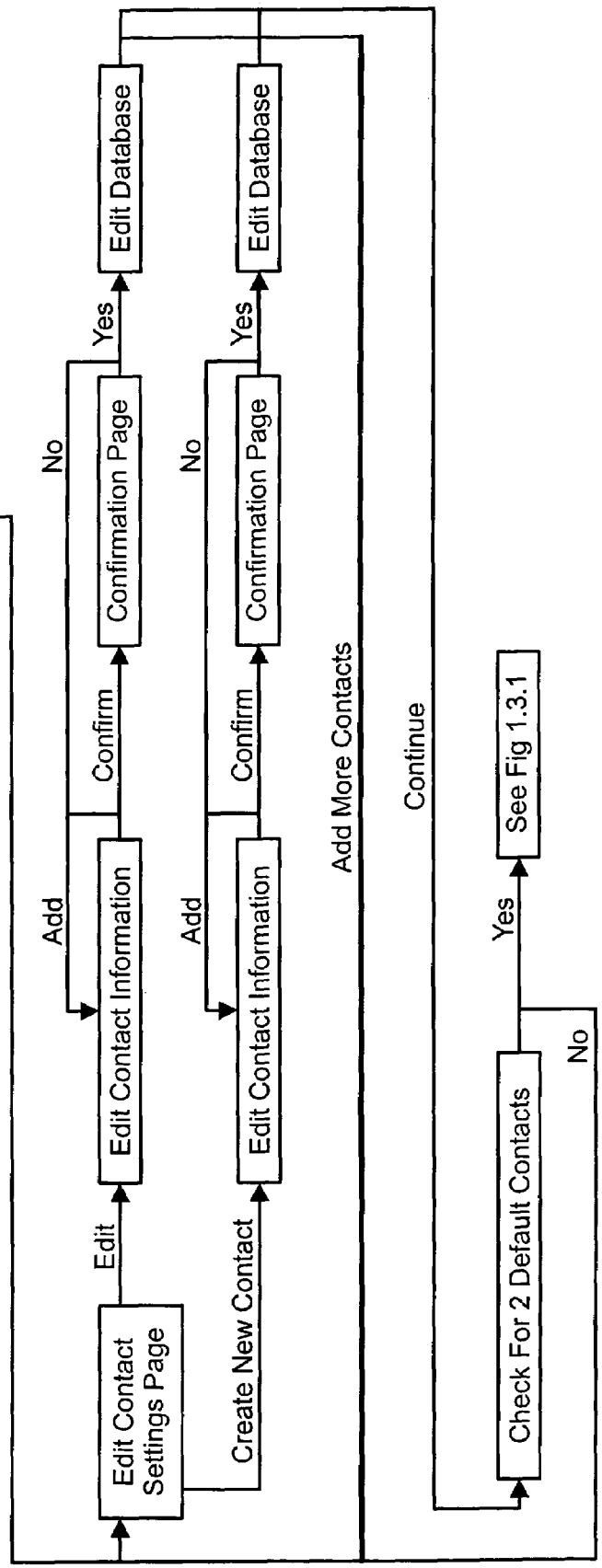
FIG. 6(d)

METHOD AND SYSTEM FOR ASSET TRACKING

This application claims priority from Canadian Patent Application No. 2,355,426, filed Aug. 17, 2001, and incorporated herein by reference.

The invention relates to the field of telematics, and more specifically to a system and method for remote tracking of assets by using a cellular telephone and Internet communication network where the remote tracking includes locating, configuring and monitoring devices associated with the asset being tracked.

BACKGROUND OF THE INVENTION

The term telematics is often used to refer to automobile based asset tracking systems that combine global positioning system ("GPS") satellite tracking and wireless communications for automatic roadside assistance and remote diagnostics.

Referring to FIG. 1, there is shown a block diagram illustrating a general telematics system 100 in accordance with the prior art. Typically, a telematics system 100 includes services 110, platforms 120, networks 130, auto/freight sector clients 140, and positioning technologies 150. The services 110 provided by the telematics system 100 may include automatic roadside assistance, accident notification, traffic information, diagnostics, mobile Internet access, fleet management, and navigation. The platforms 120 on which the telematics system 100 may update may include servers, gateways, and billing and customer-care call centres. The networks 130 by which communications are provided may include voice, short messaging system ("SMS") messaging, and wireless application protocol ("WAP"). The auto/freight sector clients 140 serviced by the telematics system 100 may include passenger vehicles, trucks, freight, public safety applications. Typically, telematics systems 100 perform applications including vehicle or equipment (i.e. asset) location, driver concierge services, fleet management, and navigation/traffic information services.

Typically, an asset tracking device or module is installed in the vehicle to be tracked. The location of the device is determined by the telematics system 100 using a positioning technology 150 such as GPS or time difference of arrival ("TDOA"). The location information is then provided to an application to service a customer.

GPS technology provides specially coded satellite signals that can be processed in a GPS receiver that enables the receiver to compute position, velocity and direction. The main problem with current GPS technology is the requirement for an unobstructed view of the sky for communication with GPS satellites. Its advantage is that is can provide a location anywhere in the world without any additional infrastructure on the ground. Improved receiver performance and signal processing and new technologies, like "Enhanced GPS", will provide locations where traditional GPS would fail.

On the other hand, TDOA uses the existing cellular network infrastructure to determine location. Referring to FIG. 2, there is shown a flow diagram illustrating a typical TDOA process 200. The process requires signal timing information from at least three different antenna sites. At step 1, a handset or vehicle places a call (e.g. a 911 call). At step 2, antennae receive the signal from the handset or vehicle and pass it to a carrier's mobile switching office. At step 3, TDOA equipment measures the difference in the time the cellular radio signals arrive at the antenna sites and translate that data into location data (i.e. longitude and latitude data). At step 4, the carrier forwards voice call and location data to a Public Safety Answering Point ("PSAP"). The use of TDOA is typically restricted to areas where coverage from multiple towers is available.

The communications networks 130 for linking tracking devices to platforms 120 to provide services 110 to customers, include cellular and telephone networks. With respect to cellular networks, network providers, such as Aeris.net™ ("Aeris") and Cellemetry®, typically make use of the Advanced Mobile Phone System ("AMPS") control channel frequencies for the transfer of small data packets. The use of the cellular network control channel provides more robust communication than cellular voice traffic so that it is possible to communicate with devices located in places where ordinary cell phones have marginal or intermittent voice coverage. Clients of these virtual carriers can make use of a TCP/IP data link to connect their operations centre to the virtual carrier network which then provides continent wide coverage through cellular service providers.

For example, in U.S. Pat. No. 6,131,067, to Girerd, et al, a client-server based system is described in which the location of a tracking device is determined using GPS information. This location is then reported to a user via the Internet.

While tracking assets is important, also of importance is the personal safety of users of the asset, such as a motor vehicle. It is recognized that most vehicles are or will be equipped with some form of tracking system. However, none of these systems are able to monitor the personal safety of the user from a remote location when the user is outside or some distance from the vehicle.

What is lacking in existing telematics systems and asset tracking devices, however, is a way for a user to not only locate a tracking device but also to effectively configure the tracking device to monitor the vehicle or asset or a component of the asset in which the tracking device is installed. What is also lacking is a way for asset tracking devices to monitor panic alarms generated by persons in the proximity of monitored assets.

SUMMARY OF THE INVENTION

In accordance with one aspect of the invention, an asset tracking system is provided that includes: a tracking device for mounting in an asset for receiving a panic alarm indication and for communicating GPS information and the panic alarm indication over a cellular telephone network; a panic alarm pendant for carrying by a first user for transmitting a panic alarm signal; a RE receiver module for mounting in the asset for receiving the panic alarm signal from the pendant and for generating the panic alarm indication when within a predetermined radius; and, a server coupled to the cellular telephone network for receiving the panic alarm indication and the GPS information and for displaying the panic alarm indication and a location to a second user.

In accordance with another aspect of the invention, a method for configuring an asset tracking device is provided that includes the steps of: accessing a server from a client; providing a serial number from the client to the server; the serial number uniquely associated with the asset tracking device; interrogating the server based on the serial number; transmitting configuration information from the server to the client in response to the step of interrogating; displaying the configuration information at the client so that a user can review and selectively modify the configuration information; modifying the configuration information at the client to produce modified configuration information; the modified configuration information representing changes to the configuration of the asset tracking device; transmitting the modified information from the client to the server, analyzing the modified configuration information at the server to produce processed configuration information and storing the processed configuration information in a database associated with the server; and, transmitting the processed configuration information from the server to the asset tracking device, thereby configuring the asset tracking device.

BRIEF DESCRIPTION OF THE DRAWINGS

Embodiments of the invention may best be understood by referring to the following description and accompanying drawings in which:

FIG. 4(a) is a top view illustrating a tracking device in accordance with an embodiment of the invention;

FIG. 4(b) is an end view of the tracking device of FIG. 4(a);

FIG. 5 is an exemplary web page flow chart in accordance with an embodiment of the invention;

DETAILED DESCRIPTION OF THE PREFERRED EMBODIMENTS

In the description and drawings, like numerals refer to like structures or and/or processes.

Figure 1:
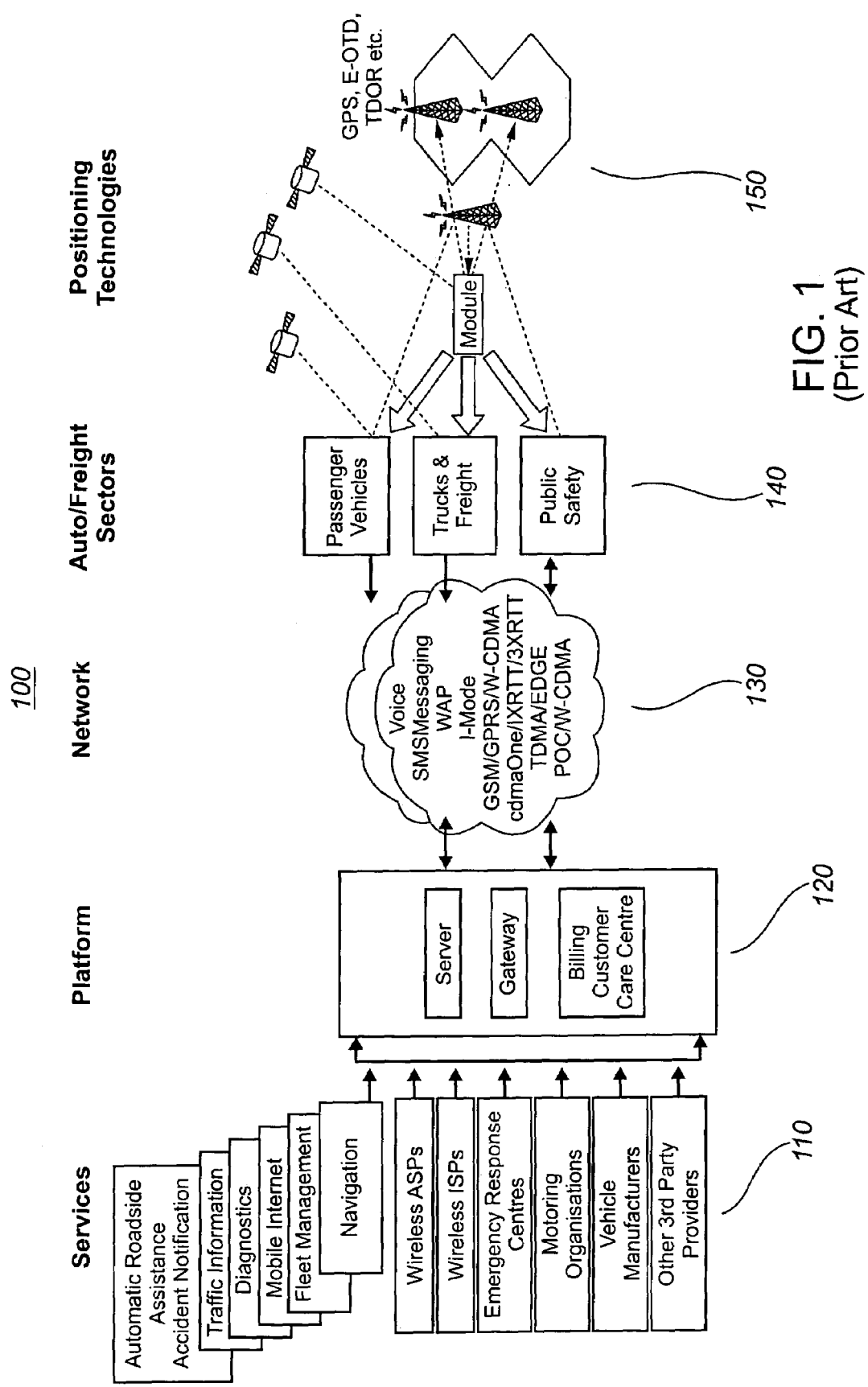
FIG. 1 is a block diagram illustrating a general telematics system in accordance with the prior art.
Figure 2:
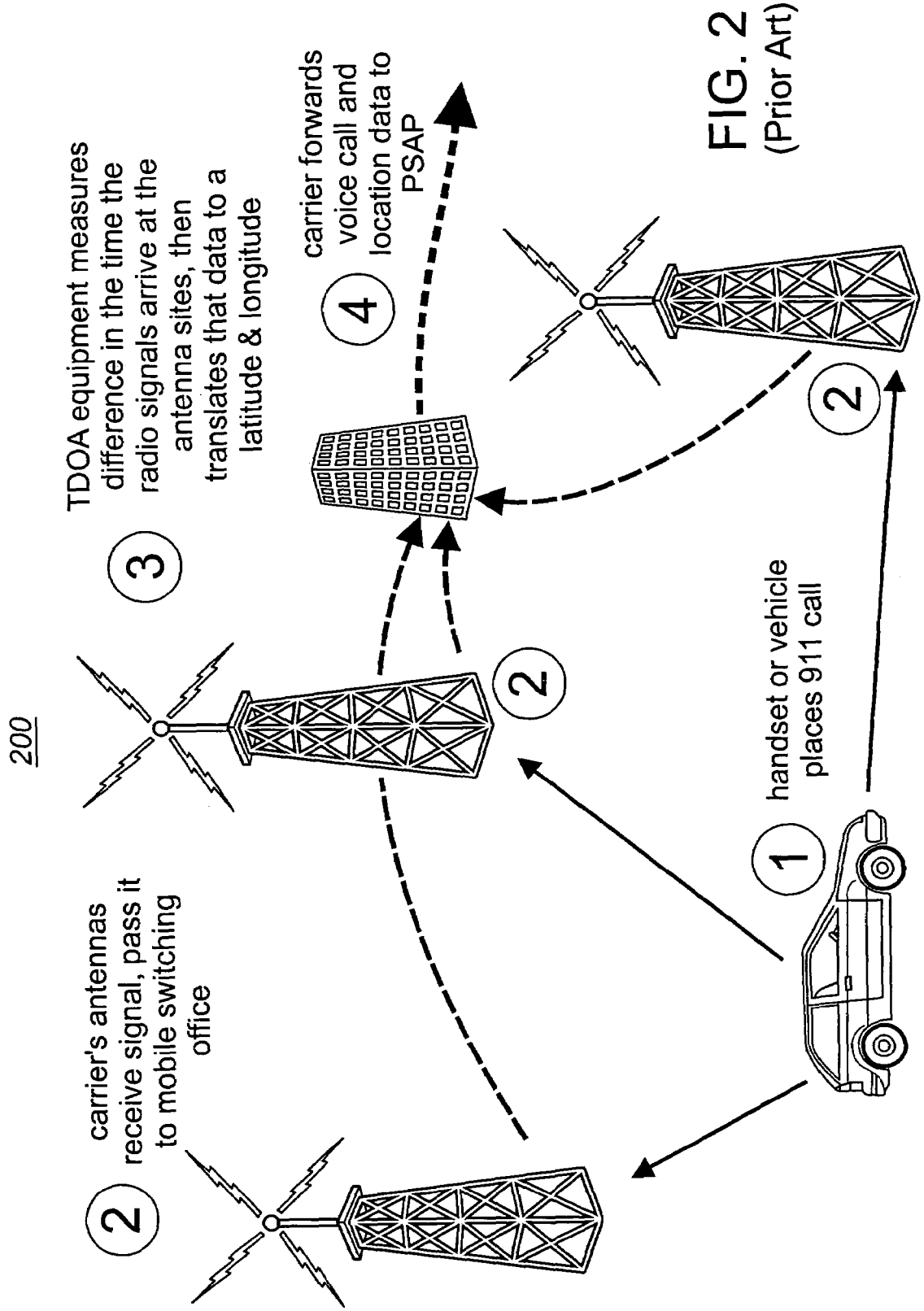
FIG. 2 is a flow diagram illustrating the TDOA process in accordance with the prior art.
Figure 3:
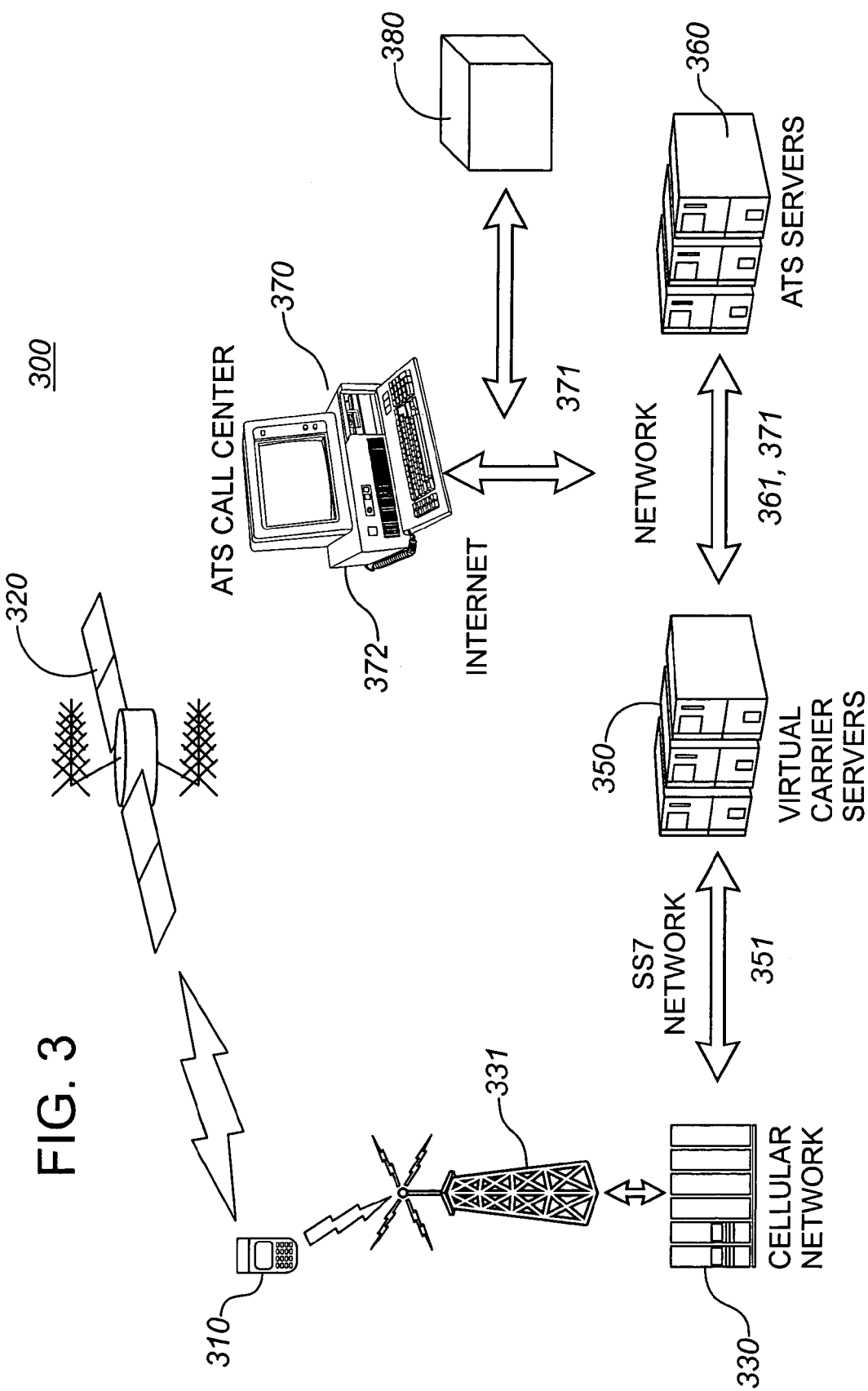
FIG. 3 is a block diagram of an asset tracking system ("ATS") in accordance with an embodiment of the invention.

System. Referring to FIG. 3, there is shown a block diagram of an asset tracking system ("ATS") 300 in accordance with an embodiment of the invention. The ATS 300 allows an asset tracking service provider to provide asset tracking related services to customers. The ATS 300 includes the following: a tracking device 310 that is installed in a customer's vehicle or asset that is to be tracked; a GPS including satellite transmitters 320 for providing GPS signals to the tracking device 310 to facilitate positioning; a cellular telephone network 330 including antennae 331 for communicating with the tracking device 310; virtual carrier servers 350 for providing virtual carrier services (e.g. Aeris or Cellemetry) for communicating with the cellular telephone network 330 over a network 351 using, for example, common channel signaling system number seven ("SS7"); and, ATS servers 360 for providing ATS applications (see below) to customers, for communicating with the tracking device 310 via the virtual carrier servers 350 and cellular telephone network 330 through a network 361, and for supporting an ATS call center 370 over the Internet 371. The network 361 may also be the Internet 371. Typically, the ATS call center 370 operates 24 hours per day, 365 days per year. The ATS call center 370 includes a service provider terminal 372 operated by asset tracking service provider staff. Customers may communicate with asset tracking service provider staff via telephone (i.e. landline or cellular) or through the Internet 371 using a customer terminal 380. Customers and asset tracking service provider staff may access ATS applications locally through the tracking device 310 and/or remotely using the Internet 371 and their respective terminals 380, 372.

The ATS servers 360 may include bridge servers, database servers, alarm servers, and web servers for supporting Internet 371 access. The ATS servers 360, asset tracking service provider terminal 372, customer terminal 380, and tracking device 310 may include input devices, central processing units or CPUs, memory, and displays. The input devices include keyboards, mice, trackballs or similar devices. The CPUs may include dedicated coprocessors and memory devices. The memory may include RAM, ROM, databases, or disk devices. And, the displays may include a computer or LCD screen. The ATS 300 has stored therein data representing sequences of instructions which when executed cause the method described heroin to be performed. Of course, the ATS 300 may contain additional software and hardware a description of which is not necessary for understanding the invention.

Tracking Devices. Referring to FIGS. 4(a) and 4(b), there are shown top and end views, respectively, illustrating a tracking device 310 in accordance with an embodiment of the invention. The tracking device 310 includes a small plastic or metal casing 410 for housing internal modules (see below); a cellular antenna 420; a connector 430 for a GPS antenna (not shown); a connector 440 for a diagnostic device and for connecting other peripheral devices (not shown); and, a connector for a power cable 450 for connecting the tracking device to the power supply of the asset (e.g. vehicle) to be protected. In another embodiment, both the cellular antenna 420 and GPS antenna (not shown) may be placed inside the casing 410. The tracking device is designed to minimize size and maximize durability.

Internally, the tracking device 310 includes; a GPS receiver module connected to a GPS antenna (not shown) through a connector 430 to receive GPS signals from GPS satellite transmitters 320 to allow for the determination of positioning coordinates of the tracking device 310; a cellular modem to communicate with the tracking service provider's servers 360 through the cellular network 330 provided by a virtual carrier; and, a microcontroller which includes software for managing device modules and associated circuitry (i.e. GPS receiver, cellular modem, power requirements, alarms, motion detector, and reporting schedules), along with an Internet interface for configuring the tracking device 310 and for communicating with it. Referring to FIG. 7, there is shown a flow chart illustrating an exemplary asset tracking device method in accordance with an embodiment of the invention.

The tracking device 310 is generally connected to the tracked asset's power supply via a power cable connector 450. However, the tracking device 310 also has an internal backup power supply (not shown) to ensure continued operation even after the external power supply has been disconnected. Sophisticated motion detection and other advanced power saving techniques ensure that the tracking service provider can communicate with the tracking device 310 for a period of time even if the main battery of the protected asset has been disconnected. The backup power supply is typically a rechargeable, internal backup battery that is recharged whenever an external 12/24 volt power supply is connected to the tracking device 310.

A diagnostic device (not shown) may be connected to the tracking device 310 via the diagnostic device connector 440 which is typically a DB-9 connector. The diagnostic device typically includes a LCD display on which key parameters are displayed allowing a user to determine if the GPS receiver module, the cellular modem, and the microcontroller are operating properly. The connector 440 may also be used to connect other peripheral devices to the tracking device 310 including a panic alarm device and an hours meter device (see below).

The tracking device 310 is small, easily hidden in an asset, and communicates with the asset tracking service provider's call center 370 through a virtual carrier network 330, 331, 351, 350. This communication platform is advantageous as it offers a robust means of communication over a network that today provides the most ubiquitous cellular coverage in North America. Other communication platforms may also be used including digital cellular networks. To ensure privacy, communications with the tracking device 310 for configuring device functions or for locating and tracking are conducted through either the tracking service provider's call center 370 or through a private web portal managed by the tracking service provider.

The tracking device 310 is capable of accurately determining the location of any asset and relaying this information to the owners of the asset (i.e. customers) or to the appropriate authorities. In most cases, the location of the asset can be determined to within a matter of meters. In addition, the tracking device 310 can be configured to automatically and immediately alert the owner, or the proper authorities, if the device leaves a pre-determined area, if the power supply voltage of the asset (e.g. vehicle) drops below a predetermined value, if the tracking device 310 is disconnected from the external power supply of the asset, or if the GPS antenna connection 430 to the device has been either severed or shorted. Advantageously, these features make the tracking device an effective theft detection and asset recovery tool.

The tracking device 310 has two sensitive motion sensors that are configured to report if motion occurs. The two motion sensors are used for power management and alarm detection purposes.

The two motion sensors are configured orthogonal to one another in order to sense motion more easily. In addition, "sensitivity" settings (i.e. low, medium, high) are used to adjust the voltage threshold detection level to activate the motion sensors. Moreover, a "debounce" function is included that prevents the motions sensors from activating on spurious or transient conditions such as wind or vibration type motions. Typically, this debounce function is set at 5 seconds. That is, there must be continuous motion for a minimum of 5 seconds in order for the motion detectors to activate. Thus, these "damping" settings are configured such that a vehicle being moved by a gust of wind will not trigger the motion sensor but genuine "motion" must be established by a certain number of "movements" that happen over a period of a few seconds. This definition of motion enables several power saving features. First, if no motion is sensed for 5 minutes, whether or not the vehicle is being operated or is just parked, the GPS module is powered down to save power. This is possible since when the GPS module is powered up and the tracking device 310 is in motion, the GPS module has to constantly write new location fixes to the microcontroller. However, if there is no motion, the last location fix stored in the microcontroller will still be accurate and so the GPS module may be powered down.

Second, a power save delay parameter can be set during configuration of the tracking device 310 which specifies how long after motion ceases until the Power Save Mode is entered. This parameter can be changed from a default setting of 0 hours to up to 999 hours. After the selected power save delay time has elapsed, the tracking device 310 will enter the Power Save Mode, which is essentially a "deep sleep" mode that uses minimal power. (Again, if the value of zero is selected, then the tracking device will enter the Power Save Mode 5 minutes after motion has stopped, for example.) When the tracking device 310 is in Power Save Mode, it cannot be contacted or interrogated. When motion is sensed, the tracking device 310 immediately awakens and determines if it has experienced any conditions that should be reported as an alarm. The tracking device 310 remains powered up until the expiry of the power save delay time stored in its memory. A user can set the power save delay time to reflect the external battery capacity of the vehicle or asset in which the tracking device 310 is installed. For example, if the vehicle or asset has a small battery that may be depleted quickly, then the user may set the power save delay time to one hour. With this setting, the tracking device will "go to sleep" is there is no motion for one hour. If the external battery is more robust, then the user may wish to set the power save delay time to 999 hours so that the tracking device 310 will stay powered up and remain available for interrogation for essentially 1000 hours from the last time motion was sensed.

If the tracking device 310 has gone into the Power Save Mode, only the cellular module (not the GPS module) awakens for a defined period every 24 hours. During that defined period, the tracking device 310 "listens" to the cellular network 330 for a "page" so it can be sent a locate command to determine its position or so it can receive configuration changes from the user. The servers 360 control and change the time for this daily reporting. Daily reporting is typically conducted in the early morning when network traffic is at its lowest point.

As mentioned, the tracking device 310 has an internal power supply, typically a battery. As soon as the external power supply is lost, an alarm message is received by the servers 360 and call center 370 indicating that the situation should be investigated. Therefore, the internal battery needs to last long enough to get a fix on where the tracking device 310 is located. The customer or call center staff may then choose to dispatch the police to retrieve the vehicle or asset. Typically, the tracking device 310 draws little power from the vehicle battery. The tracking device's internal batteries are selected to minimize the overall size of the tracking device 310 yet meet the necessary power requirements. The internal batteries are maintained at a full charge as long as the external power supply is available. By minimizing overall size of the tracking device 310, the device may be installed in smaller sized assets including computers and pumps. In fact, small size enables the tracking device 310 to be used for monitoring the location of children, pets. Alzheimer patients, or criminals. With greater size reductions, implanting tracking devices in animals or people may be possible.

The ATS 300 includes a "Panic Alarm" function that is initiated by a contact closure monitored by the tracking device 310. The contact closure may be between two pins on the diagnostic device connector 440. The Panic Alarm function may also be used in conjunction with an additional panic alarm device. The panic alarm device may be installed in a vehicle along with the tracking device 310. The Panic Alarm function could be used, for example, in a taxi. Here, the panic alarm could be generated by a secret, under seat switch that is activated by the driver to summon help if the driver is attacked or the taxi is hi-jacked.

In addition, the panic alarm device may act as the "receiver end" for a pendant type "Medical alert" transmitter device or similar devices typically used by seniors to summon help in the event of a fall or other emergency. These pendant devices typically include a small radio frequency (RF) transmitter. The receiver component of these systems picks up the signal transmitted from the pendant device and initiates an auto-dialer that calls an alarm-monitoring center to report the emergency.

According to one embodiment, the RF receiver is modified for installation in a vehicle where it may be powered by the vehicle's power supply. If a user pushes the panic alarm button on the pendant device, a signal is sent from the pendant to the receiver contained in the panic alarm device. The receiver will be able to receive signals transmitted by the pendant device within a predetermined radius from the vehicle. In other words, the transmitter in the pendant device has a known transmission range. Upon receipt of this signal, the panic alarm device closes a contact. This contact closure, and hence the presence of a panic alarm, is monitored by the tracking device 310. The panic alarm is then relayed by the tracking device 310 to the call center 370 where it is automatically forwarded, along with the location of the vehicle, to the appropriate authorities. In this way, the tracking device 310 acts as a security "base station" for the user. While the location information identifies the precise location of this security "base station", knowing that the user of the panic alarm device is within the predetermined RF reception area for signals transmitted by the pendant device provides the authorities with the approximate location of the user.

Figure 8A:
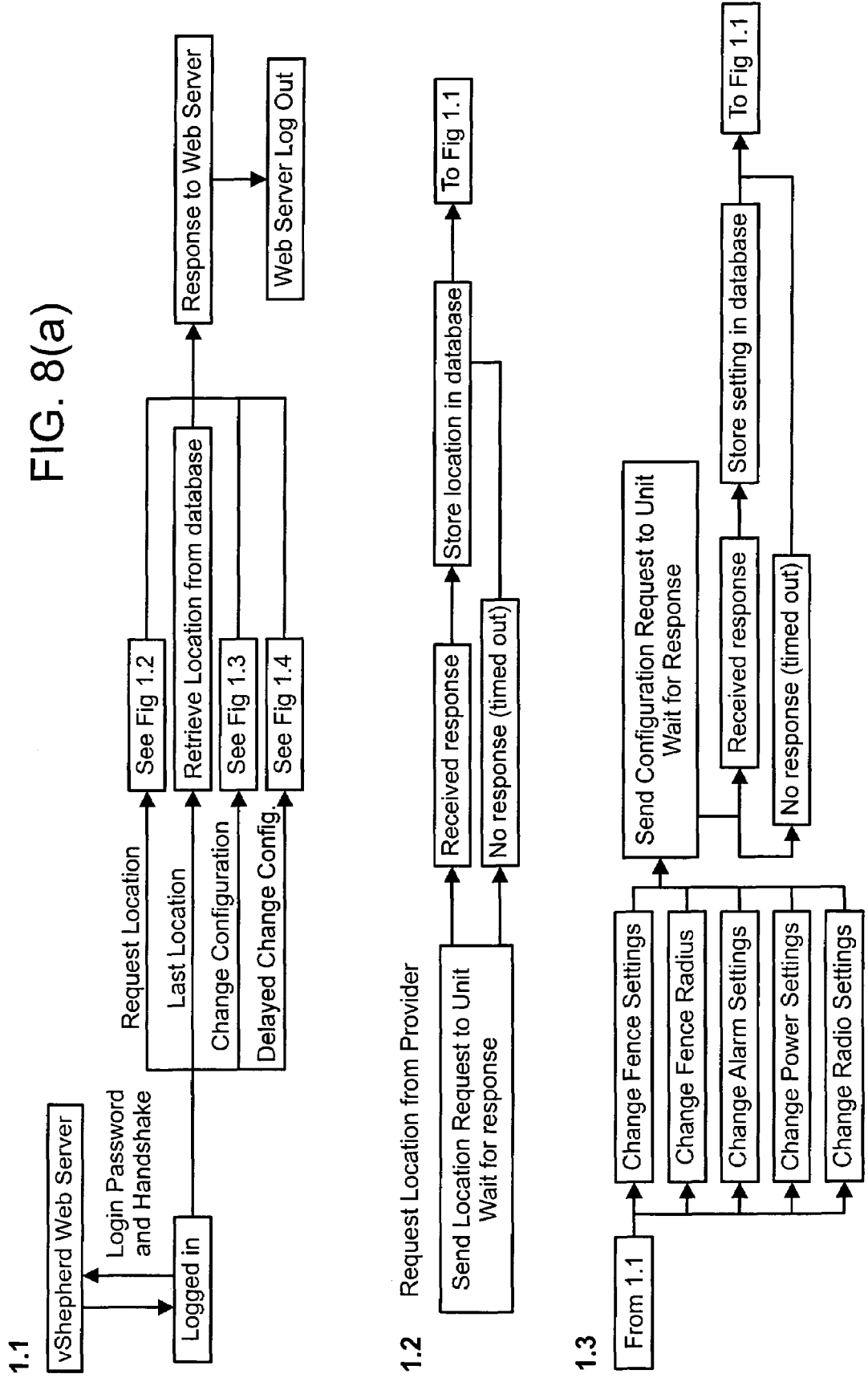
Figure 8B:
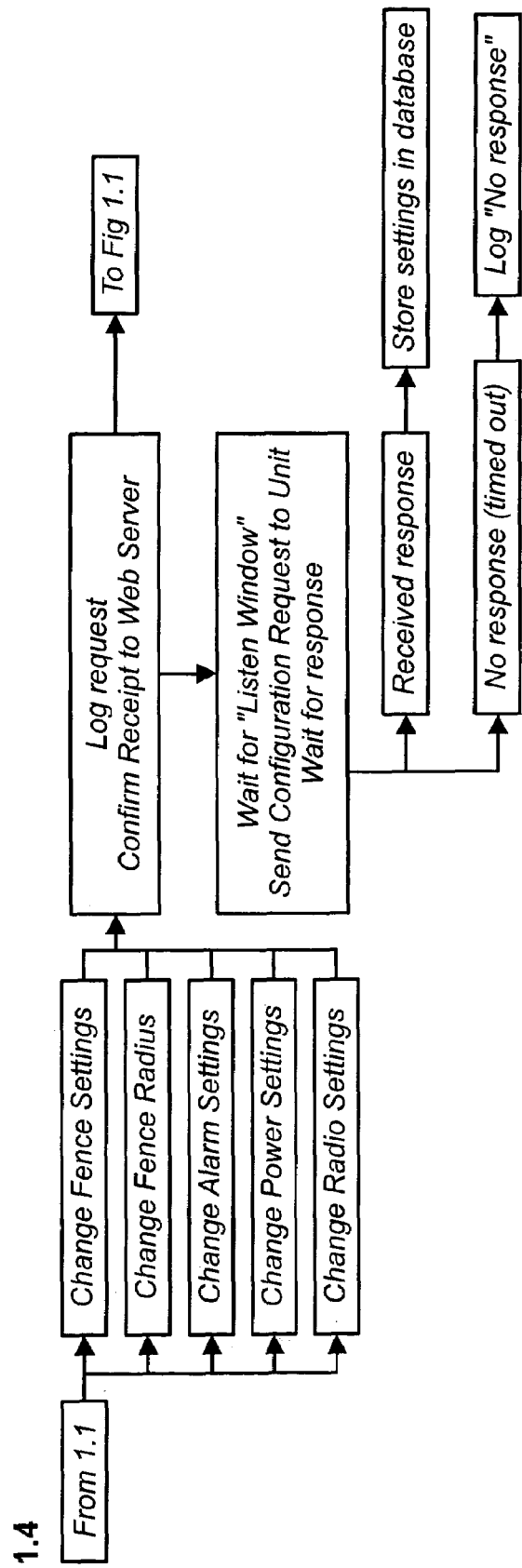
Figure 8C:
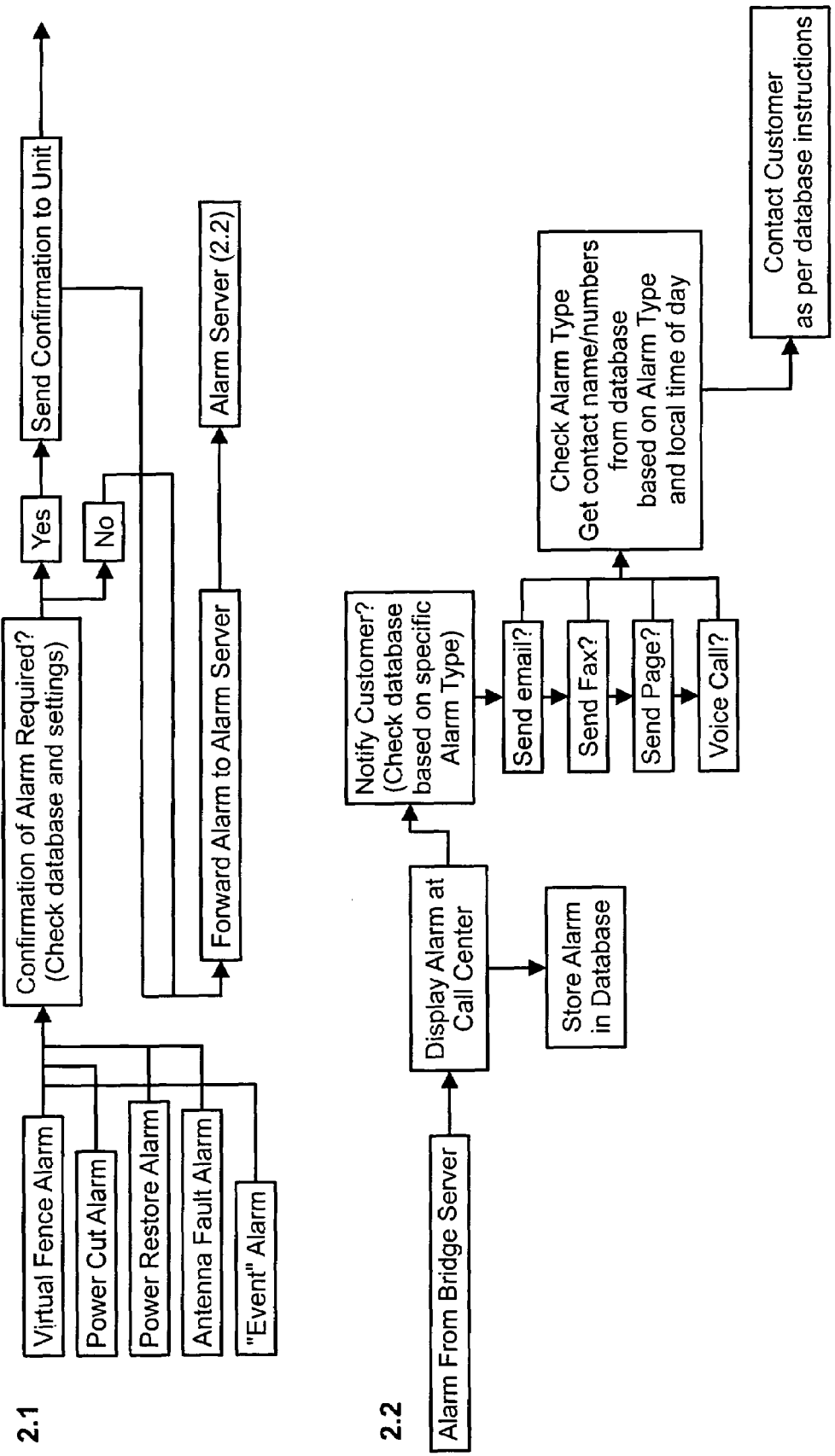

ATS Servers. The ATS 300 includes several servers 360 and a call center 370 for the management of tracking devices 310. The servers 360 and call center 370 constitute a tracking device management system that stores data and communicates with tracking devices 310 through the cellular phone network 330 and via a web interface 371. The servers 360 include a Virtual Carrier Bridge Server, a Database Server, an Alarm Server, and a Web Server. Thus, the tracking device management system includes the following components:

1. Virtual Carrier Bridge Server: This server processes and formats all of the commands and data to be sent via a TCP/IP connection 361 to the virtual carrier servers 350 at virtual carrier operation centers where they can be relayed to tracking devices 310 over the AMPS cellular phone network 330 in North America, Mexico, and parts of South America. Similarly, this server receives and processes data and reports that have been received from tracking devices 310 at a virtual carrier's operation centre and relayed to the call center 370 via a TCP/IP connection. Referring to FIG. 8, there is shown a flow chart illustrating an exemplary bridge server method in accordance with an embodiment of the invention.
2. Database Server: This server maintains a database for storing all relevant data pertaining to tracking devices 310, customers, users, alarms and reports, billing information, and the like.
3. Alarm Server: All alarms and reports that arrive at the call center 370 (i.e. after being relayed from a tracking device 310 through the AMPS cellular network 330 and the virtual carrier's servers 350) are processed by the alarm server and, as required, are written to the database. Parameters chosen by the customer and stored in the database determine who should be automatically advised of the occurrence of the alarm at the particular day and time that the alarm has occurred. For example, a Power Restored Alarm (see below) is not routinely passed on to the customer but is used by the tracking service provider to monitor the status of deployed tracking devices. For example, the receipt of a Power Restored Alarm could be of assistance in locating a missing asset that had not been recovered. If a vehicle were stolen from a location where there was no cellular service (e.g. a remote mountainous area), and the vehicle's battery had been disconnected for a period of time so that even the internal back-up battery in the tracking device had depleted, then if the vehicle was ever moved into an area with cellular coverage, and the vehicle battery was re-connected (i.e. before the tracking device was discovered or destroyed), then this alarm message would signal to the call center 370 that the vehicle had resurfaced in an area where a Locate command could now be performed.
4. Call Centre: The tracking service provider's call center 370 is typically staffed 24 hours per day to monitor all components of the tracking device management system. In addition, customers that may not have access to the Internet 371 may call a toll free number to have call center staff manage their account or to make inquiries about alarms that they have received notification of via the automated alarm notification system.
5. Web Server: The tracking service provider's web server provides the means for customers to communicate with and control their tracking devices 310. The web server maintains a web portal or tracking device management web interface which is described below.

Functions. For effective theft detection and asset location, the tracking devices 310 and/or ATS 300 include the following functions:
1. Motion Detection: As described above, the GPS receiver and cellular modem turn on immediately upon detection of movement and the GPS module proceeds to obtain a location.
2. Virtual Fence Violation Alarm: The user is able to define a virtual fence ("vFence") for the asset to be protected (e.g. between 100 meters and 100 kilometers). If the asset moves beyond this user-defined fence, a vFence violation alarm is reported to the call center 370. As will be described below, settings for the vFence alarm may be made over the Internet 371.
3. Locate: The user is able to locate the protected asset using the mapping services resident on, or accessed from, the tracking service provider's servers 360. As will be described below, settings for the locate function may be made over the Internet 371.
4. Low Power Alarm: If external power drops below 80% of its nominal input level for longer than three minutes, for example, then an alarm is sent to the call center 370.
5. Power Cut Alarm: If external power is cut for longer then 15 seconds, for example, then an alarm is sent to the call center 370.
6. Restored Power Alarm: When power is restored after being cut, the tracking device 310 will transmit a power restore message to the servers 360.
7. Panic Alarm: For personal security, a button on a personal panic device, the receiver of which is co-located with and connected to the appropriate pins of the DB-9 connector 440 on the tracking device 310, may be used to send a panic alarm to the servers 360 and call center 370 via the tracking device 310.

8. Hours Meter: The hours meter function emulates a physical "hours meter" that is typically used to record the number of hours that an engine, or similar component, has operated. This function is used by connecting a voltage source, such as the "ignition on" voltage that indicates that an engine is operating, to designated pins of the DB-9 connector 440 of the tracking device 310. A counter in the tracking device's 310 microcontroller commences to record time whenever such a voltage source is present. Thus, the counter functions as an hours meter and records the number of hours the associated engine, or other component, has been in operation. The user is able to define a time interval after which the tracking device 310 will send a message to the servers 360 and database that includes the current hours meter reading from the counter. The servers 360 can be configured to automatically forward an e-mail message to the customer reporting the current hours meter reading and indicating that the hours meter has reached a configured time increment.
9. Power Save Mode: In order to reduce power consumption, the tracking device 310 can be programmed to "sleep" and will consume minimal power if no movement has occurred for a user preset time from 0 hour to 999 hours, for example, and "awaken" when motion is detected by the microcontroller. If the preset time is set to zero, then the tracking device 310 will typically enter the "Power Save Mode" after 5 minutes.
10. Daily Network Listening: Regardless of whether "awake" or "asleep", the tracking device 310 turns on its cellular modem at a predefined time to be available for communications.
11. Monthly Heartbeat: Once a month, for example, the tracking device 310 calls the servers 360 and reports its current position.

Tracking Service Provider Specific Commands. The following commands may be sent to the tracking device 310 by the tracking service provider via the service provider terminal 372 and/or servers 360:

1. Deactivate Device: This command can be sent by the tracking service provider to deactivate a device if a customer's account is delinquent or some such reason. Upon receipt of this command, the tracking device 310 no longer responds to any customer instructions received through the web interface. But, provided that the tracking device 310 is still connected to an external power supply (or if the internal backup battery is still operational), the tracking device 310 continues to monitor the cellular network 330 and accepts an "Activate Device" command (see below) sent by the tracking service provider to reactivate the tracing device 310 enabling it to accept subsequent tracking service provider and/or customer commands.
2. Activate Device: This command can be sent by the tracking service provider to reactivate a tracking device 310 that has previously been sent a "Deactivate Device" (see above) command. This command may be sent in order to reactivate a customer's tracking device 310 after a delinquent account has been brought current.
3 Change Report Day: Each tracking device 310 is preprogrammed at the factory to send a "heartbeat" report to the servers 360 on a particular day of each month. This command can be used to cause a tracking device 310 to send the heartbeat report on a different day of the month.
4. Change Report Time: Each tracking device is pre-programmed at the factory to send the heartbeat report to the servers 360 at a particular time, on the selected "Report Day" of each month. This command can be used to cause a tracking device 310 to send the heartbeat report at a different time on the selected Report Day.
5. Wakeup and Locate: Each tracking device 310 is preprogrammed at the factory so that even if the device is in the Power Save Mode, the unit will be fully "awake" and ready to accept commands for one hour out of every 24 hours. During this one hour awake period, the tracking service provider can send any tracking device 310 a locate diagnostic command which causes the tracking device 310 to attempt to obtain a GPS measurement for four minutes and forward the location data to the servers 360, thereby confirming that all GPS and communication functions are working properly.
6. Track Unit For "x" Minutes: Sending this command (accompanied by a certain number of minutes) to a tracking device 310 causes the device to report to the servers 360 every fifteen seconds. The tracking device 310 alternately reports either a geographic position or the speed and heading data for the number of minutes that has been specified in order to permit "live" tracking of an asset in motion.

Tracking Service Provider and Customer Commands. The following commands may be sent by to the tracking device 310 by either the tracking service provider or customer via the service provider terminal 372 or customer terminal 380, respectively, and/or servers 360:

1. Power Save Delay: As described above, in order to conserve the power of the external battery providing power (e.g. at 12/24 volts) to the tracking device 310, a motion detector causes the device to power down. Therefore, the tracking device 310 does not monitor the cellular network 330 and cannot accept incoming calls, except for the one hour (or other time determined by the tracking service provider) per day when the device is programmed to wake up and monitor the network 330. With this command customers can set the number of hours after any motion stops before the unit will go into this Power Save Mode. The default value for this parameter for tracking devices leaving the factory is 1 hour. This command allows customers to manage the power consumption of the tracking device 310 and appropriately match this consumption to the capacity and circumstances of the external power supply.
2. Activate Power Save Report Mode: This command will cause the tracking device 310 to report its location to the call center 370 on every occasion just before the tracking device 310 goes into the Power Save Mode. This command has fleet management applications. Such a series of reports may provide a customer with a list of locations where the tracking device 310 had ceased to move for the period of time selected by the "Power Save Delay" command. This could, for example, provide a record or log for the customer of any stops of greater than 5 minutes or greater than 1 hour, etc. This function ensures that, at all times, the tracking service provider has an accurate location for the tracking device 310 (if the unit is in Power Save Mode) or can obtain an accurate location (if the tracking device 310 is in a vehicle that is moving).
3. Deactivate Power Save Report Mode: If the customer has activated the "Power Save Report Mode" in a tracking device 310, it can be deactivated with this command.
4. Activate Power Alarms: If this command is sent to a tracking device 310, the device will provide the servers 360 with a message indicating that one of the "Power Alarm" conditions (as described below) has occurred. Configuration settings chosen by the customer specify who should be immediately and automatically contacted by the tracking service provider in this event. When a tracking device 310 is shipped from the factory the default setting for the Power Alarms is "OFF".

5. Deactivate Power Alarms: If the Power Alarms in a tracking device 310 have been activated, sending this command instructs the device to refrain from contacting the servers 360 when a Power Alarm condition occurs.

6. Set vFence Radius: If this command is sent to a tracking device 310, the device will establish (by mathematical calculation) a virtual fence ("vFence") around itself, typically circular in shape having a center at the position where the tracking device was located when the "Turn vFence On" command (see below) was sent, and having a radius ranging from 100 meters to 100 kilomenters. If the tracking device 310 moves outside of this virtual fence, then the device will send a message to the servers 360 indicating that the device has left the "permitted area" as defined by the "Set vFence Radius" command.

7. Turn vFence On: If this command is sent to a tracking device 310, the center of the permitted area (as defined by the Set vFence Radius command) is reset to the current location of the tracking device 310. From then on, the tracking device 310 will send a message to the servers 360 if the device moves outside of the permitted area. Before sending this alarm message, the vFence function is turned off. After this alarm has been received, the customer may choose to reactivate (and re-center) the vFence or to continue to monitor the location of the asset. When a tracking device 310 is shipped from the factory the default position for the vFence is "OFF".

8. Turn vFence Off. If the vFence function has been activated, sending this command deactivates the vFence function.

9. Locate: Sending this command causes a tracking device 310 to report its location to the call center 370 in one of four possible ways depending on the conditions existing at the time the command was sent:
   a) If the tracking device 310 has not moved for a period greater than the power save delay time that has been set in the device, the customer would be advised by the servers 360 via the customer terminal 380 that the device is in Power Save Mode and the most recent location data from the servers' database would be provided to the customer. The customer would also be given the option of having the system 300 interrogate the tracking device 310 during the next daily time period when the device will be "awake" and "listening" to the cellular network 330, if the device has not already reported a new location to the servers 360 by that time. A message also advises the customer of the time when updated location data will be available. If the Power Save Report Mode is enabled, the reported position will be the current position of the unit.
   b) If the tracking device 310 is not in Power Save Report Mode but the device has not moved for 5 minutes, then the most recent location stored in the tracking device's memory will be reported, which will be, by definition, the current location of the device.
   c) If the tracking device 310 is not in Power Save Report Mode and it has moved within the last 5 minutes, but is currently not moving, the the current location will be reported.
   d) If the tracking device 310 is not in Power Save Report Mode and it is in motion, then the current location and fact that the device is in motion will be reported.

10. Power Down Device: This command can be sent to a tracking device 310 to shut the device down entirely so that it is not even capable of monitoring the cellular phone network 330 or registering on the network. Typically, tracking devices are shipped from the factory in the "Power Down Mode". Once having entered this mode, the tracking device 310 can only be turned on by connecting (or removing and re-connecting) an external 12/24 volt power supply to the device.

11. Hours Meter Interval: This command can be sent to a tracking device 310 to cause it to send a report to the servers 360 when a voltage source (e.g. ignition voltage) has been present on designated pins of the DB-9 connector 440 for a selected increment of time, referred to as the "hours meter interval". Typically, this interval may range from 10 hours to 9,999 hours. Tracking devices are shipped from the factory with no interval set so that automatic reports are not generated until the customer has configured the tracking device with a desired interval. The user is given the option of entering into the database an "offset" number that can be used to synchronize the hours meter reading reported by the tracking device 310 with a physical, preinstalled, external hours meter. This offset number allows the readings from the hours meter function to be made consistent with the readings from the physical hours meter.

12. Hours Meter Report: This command can be sent to a tracking device 310 at anytime causing the device to report its current hour meter reading.

Alarms and Reports. The following alarms and reports may be generated by the asset tracking system 300:

1. External Power Low Warning: If the Power Alarms function (see above) has been activated in a tracking device 310, then the device will send an alarm to the servers 360 indicating that the external power supply voltage (e.g. 12/24 volts) has dropped below 80% of its normal value.

2. External Power Lost Alarm: If the Power Alarms function has been activated in the tracking device 310, and the external power supply (e.g. 12/24 volts) is removed for 15 seconds, then the device will send an alarm to the servers 360 indicating that the external power supply has been lost. The sewers 360 will send a confirming message to the tracking device 310 indicating that the alarm message has been received. If the tracking device 310 does not receive a confirmation of the receipt of the alarm message within 5 minutes, then the device will attempt to resend the alarm message up to 5 times.

3. External Power Restored: If the Power Alarms function has been activated in the tracking device 310, then the device will send an alarm to the servers 360 indicating that the external power supply (e.g. 12/24 volts) has been restored.

4. Panic Alarm: As described above, some tracking devices 310 may be configured to make use of a Panic Alarm function that is typically triggered by a contact closure between two pins on the multi-pin (DB-9) tracking device connector 440. If a contact closure is detected by the tracking device 310, then the device will send a Panic Alarm report indicating that immediate assistance is requested at the reported location of the device. The Panic Alarm message sent by the tracking device 310 contains current location information for the device. The servers 360 will send a confirming message to the tracking device 310 indicating that the alarm message has been received. If the tracking device 310 does not receive a confirmation of the receipt of the alarm message within 5 minutes, then the device will attempt to re-send the alarm message up to 5 times. If no receipt is received, then it will attempt the same sequence every 24 hours.

5. vFence Violation Alarm: If the vFence function has been activated in a tracking device 310, and if the tracing device 310 moves to a location that is outside of the permitted area (defined by the vFence radius), then the device will first deactivate the vFence and send an alarm to the servers 360 indicating that the device has travelled a distance greater than the allowed vFence radius from the point where the device was located when the vFence was activated. The servers 360 will send a confirming message to the tracking device 310 indicating that the alarm message has been received. If the device does not receive a confirmation of the receipt of the alarm message within 5 minutes, then the device will attempt to re-send the alarm message up to 5 times. If no receipt is received, then it will attempt the same sequence every 24 hours.

6. Power Save Mode Report: If the customer has chosen to have the tracking device 310 report its location prior to going into Power Save Mode, then this report provides the location of each such occurrence. This location is stored in the servers 360 for subsequent customer reports and/or use.

7. Heartbeat: As mentioned above, this report is a monthly confirmation (i.e. at the "Report Time" on the "Report Day") that the tracking device 310 is functioning properly. Typically, this report is sent to the servers 360 only.

8. Antenna Sense Alarm: This report is sent if the antenna for the GPS module has been tampered with or is not functioning properly.

9. Hours Meter Report: If the tracking device 310 has been configured with an "hours meter interval", then this report will be sent by the device to the serves 360 each time that the counter in the device's microcontroller indicates that ignition voltage has been present on the appropriate pin on the DB-9 connector 440 for the specified period of time.

Alarm Processing. The alarm server receives all tracking device alarms and reports (e.g. Low Power, Power Cut, vFence Violation, Antenna Sense, or Power Save Location Report) that are generated. The alarm server writes the time stamped alarm/report to a database and issues all of the notifications the customer has chosen in the customer configuration portion of the database which correspond to the customer's instructions for processing alarms. A text, voice, fax, email, pager, or SMS message advises the customer of the nature and time of the alarm and requests the customer to either: (a) log on to the tracking service provider's website to further investigate the nature of the alarm; or, (b) call the tracking service provider's call center 370 at a toll free number to provide instructions.

The alarm server generates an alarm at the call centre 370 and if there has been no response (within, for example, 10 minutes) from any of the parties that have been automatically alerted by the alarm server of the alarm, then call center staff will take action. Following the tracking service provider's procedure manual, call center staff may contact the customer at a specific telephone number. Alternately, if it can be seen from interrogation of the tracking device 310 that an asset that should not be on the move, is actually moving, the tracking service provider will have a procedure in place for contacting the police. The police will be advised that the tracking service provider has identified unauthorized activity pertaining to the asset but that so far the owner has not been contacted. If the customer does not have access to a terminal 380, he may choose to call the 1-800 number in response to an alarm and communicate directly with call center staff who may use the web interface on behalf of the customer. Call centre staff will provide the customer with an "Incident Report Number" and instructions advising the customer contact the police to make a stolen property report and to provide the police with the tracking service provider's 1-800 number and other relevant information.

Tracking Device Management Web Interface. Referring to FIG. 5, there is shown an exemplary web page flow chart in accordance with an embodiment of the invention. The web page flow chart illustrates the hierarchy of web pages 500 that the ATS 300 may present to users through the web server and the tracking service provider's website. Users (e.g. customers, police officers, asset tracking service provider staff, etc.) may view series of pages in several languages including English 505, Spanish 590, and French 595. In each language, five main web page series are available to users under the following pages: "Customer Login" 510, "Police Login" 570, "Open Now Account" 575, "Contact Us" (i.e. the tracking service provider) 580, and "Privacy Statement" 585.

To manage tracking devices, customers would visit the website home page established by the tracking service provider using their terminals 380. Customers would typically login to the ATS 300 using the Customer Login 505 series of pages. These pages may also be used by tracking service provider staff using their terminals 372. In particular, tracking service staff would routinely use the related "Tracking Service Provider Functions" 565 series of pages. When a login page is completed and submitted by the customer or other user, the ATS 300 checks to determine that the customer number, username, and password are valid. It also checks an access level assigned to the user for determining what screens to display to the user and what unctions the user is authorized to perform with respect to tracking devices registered to the user. The access level field may be a two character field with the letters A through J being assigned for various access levels for customers and with the letters K through ZZ being reserved for tracking service provider staff. Typically, the web page series listed under Customer Login 505 in FIG. 5 would be presented to customers having a high access level. Customers having lower access levels would not be presented with buttons or messages concerning functions that are not permitted at that lower access level. Access levels may include the following:

A: Customer Administrator. Can perform any permitted customer function.

B: Can review database of all tracking devices in permitted groups that are registered to the customer. Can locate any tracking device registered to the customer. Can change their own username and password.

C: Includes level B functions. Can alter alarm settings of tracking devices in permitted groups that are registered to the customer.

D: Includes level C functions. Can alter customer asset data fields for devices in permitted groups that are registered to the customer.

E: Includes level D functions. Can create and edit customer groups. Can add or delete users with access to the customer's tracking devices.

Immediately after a successful login by a customer, the ATS 300 checks the database to determine if any alarms have been reported by any of the tracking devices registered to the customer. Before the customer is allowed to proceed to perform other tasks, the customer is presented with any such alarms by the "Manage Occurred Alarms" 515 page. The customer is required to either clear the alarms (e.g. alarms caused by an event or circumstance known to the customer) or confirm to the tracking service provider that the asset associated with the tracking device is to be reported to the authorities as having been stolen. If the customer determines that the alarm is the result of a theft, then the customer will be presented with the "Report A Theft" 520 page as described below. In the case of External Power alarms and vFence Violation Alarms, the Locate function is not available to the user for a period of time determined by the tracking service provider. Following the receipt of either of these two types of alarms, and for this predetermined period of time, the Locate and tracking functions are only available to the tracking service provider or to the authorities investigating the reported theft.

After reviewing any unprocessed alarms 515 that have occurred, the customer is presented with the following option pages: "Report A Theft" 520, "Locate Tracking Device" 525, "Last Known Location" 530, "Tracking Device Settings" 535, "Customer/User Settings" 540, "Add A New Tracking Device" 545, "Contact Us" 550 (i.e. the tracking service provider), "Privacy Statement" 555 (i.e. of the tracking service provider), "Log Off" 560, and "Tracking Service Provider Functions" 565. The functions initiated upon selection of one of these options by a user are described in the following:

1. Report A Theft 520: A picklist allows the user to select one of the tracking devices 310 registered to that customer and confirm to the tracking service provider that the device is to be reported stolen. This function is available to a user at anytime so that in the case where the user has not had the vFence activated for any reason, but they have visually determined that their vehicle is missing, the tracking service provider can respond with the same tracking and locating services that would be used if a theft had been detected by the arrival of a vFence or Power Cut alarm. As soon as the user confirms that the asset is to be reported stolen, the ATS 300 responds by providing the user with an "Incident Report Number" that is to be provided to the police or other investigating authority. The user is also provided with a toll free number that they are instructed to give to the police. When the police contact the tracking service provider and provide the Incident Report Number, the police are given a temporary password that will allow them to perform locating and tracking functions over the web interface to assist them in locating and recovering the asset. Alternatively, tracking service provider staff at the call centre 370 can provide locating and tracking assistance to the police via telephone.

2. Locate A Tracking Device 525: Clicking on this button brings up a screen that allows the user to select a tracking device 310 from a picklist of devices that the user is authorized to access. This page may also include a search feature to assist users who have a large number of tracking devices. Once the desired tracking device has been highlighted in the picklist, a locate button on the page can then be clicked. The user then confirms that a locating operation is desired and that the user accepts the charge presented on the page, the charge being associated with the user in a billing database. The ATS 300 will then attempt to communicate with the selected tracking device 310 to obtain current location information If this attempt is not successful, then the ATS 300 will access the last known location (and related time) from the database and will display a map to the user with a message stating words to the following effect: "The current location is not available at this time. The tracking device is likely in Power Save Mode because it is not currently in motion or may be outside of cellular coverage." The user will then be given the option of having the ATS 300 obtain an updated location from the tracking device 310, even if it continues to remain stationary, during the next daily "window" when the device awakens from the Power Save Mode. If the user selects this option and accepts the charge for this service, then the user will be advised when they can expect updated location data to be available. If the tracking device 310 is not in Power Save Mode, and is activated and available, the ATS 300 display a map (scaled to show an area of approximately 5 square kilometers) to the user. The map can be zoomed out from this point for the user to confirm the area, region, or state/province, etc., that is being displayed or zoom in for increased detail with respect to the location of the tracing device 310 and asset.

3. Last Known Location 530: Ibis function may be used to query the ATS 300 database for the last reported location of the tracking device 310. The system 300 will respond by presenting a map to the user illustrating the most recent coordinates that have been reported and stored in the database along with the date and time associated with those coordinates. The user is given the option of attempting to locate the tracking device 310 or of having the device report its location during the next scheduled daily listening "window" (i.e. when the device comes out of the Power Save Mode, monitors the cellular network 330, and responds to commands). If the user selects this second option, and accepts the charge for this service, then the user will be advised as to when updated location data will be available.

4. Tracking Device Settings 535: This series of screens allows the user to alter the vFence, Power Alarm, Power Save Delay, Power Save Report Mode, Hours Meter, and Power Down functions. The system provides information to the user on the current settings and if the user accepts any charges associated with altering any of the tracking device settings, the changes are sent to the device and are written to the database when the unit responds confirming that the changes have been made. If the tracking device 310 is currently in the Power Save Mode (e.g. it is not in motion), then the user can choose to have the new settings sent to the device during the next daily window (i.e. when the device carries out of Power Save Mode, monitors the cellular network 330, and responds to commands). If the user selects this option, and accepts the charge for this service, then the user will be advised as to when the revised settings will available.

The Tracking Device Settings 535 series of pages also allows the user to perform functions such as moving a tracking device. This function requires the user to enter new information pertaining to the protected asset for storage in the database. When new information is entered, the ATS 300 temporarily suspends automated notification related functions. Once the user has completed these pages and has accepted the charge for moving the tracking device, automated notification functions are suspended until the ATS 300 receives a Power Restored Alarm. Receipt of this alarm indicates that the tracking device has been disconnected from the power supply of the current asset and reconnected to the power supply of the new asset. In addition, the user may edit the description of the protected asset (e.g. change the colour description) or assign the tracking device to a "Group" that the user has established. Groups allow the user to alter the settings of a number of tracking devices (e.g. turning the vFence or Power Alarms on or off, resetting the vFence radius, etc.) without having to select each tracking device individually to make the necessary change. If tracking device settings for Groups are altered using the pages available under the Customer/User Settings 540 page (see below), then the total cost for initiating that change for all the devices assigned to that Group is calculated and the user must confirm that they accept the resulting charge before the Group device settings are altered.

In addition, the Tracking Device Settings 535 series of pages allows the user to send a Power Down command to a tracking device 310. This command returns the tracking device 310 to its factory settings. It may be used to deactivate a tracking device 310 that is being shipped to a new location or that is being temporarily "retired" due to the seasonal nature of the customer's business. After this command has been sent to a tracking device 310 and the external power has been removed from the device, the device is reactivated by the application of an external power source. The tracking device 310 awakens from this mode with its factory settings. As such, the user may need to reconfigure the device's settings.

5. Customer/User Settings 540: This series of pages allows an authorized user to perform functions such as changing passwords, changing customer data (e.g. address, telephone number, etc.), and setting alarm notifications. By setting alarm notifications, the customer can establish different periods of the day, weekends, holidays. etc., when received alarms are to be routed to specified individuals. The ATS 300 allows the user to provide a number of telephone, pager, fax, or e-mail numbers and addresses that can be selected as the appropriate means of contacting the individuals specified for notification in the event of an alarm. For a specific customer, users with higher levels of authorization are able to manage the privileges of other users. As mentioned above, pages are provided that allow users to establish and manage Groups to which individual tracking devices may be assigned. Users may then alter the settings of a number of tracking devices belonging to a Group without having to individually select and change settings for each device. In addition, pages are provided that allow users to review and process any received alarms, review all location reports stored in the database for a tracking device, and review that status of charges made to a customer account as a result of transactions that have been accepted by an authorized user.

6. Add a New Tracking Device 545: This series of pages allows a user to add a new tracking device 310 to a customer profile. The user is prompted to enter the serial number ("S/N") of the new tracking device that is to be added to ATS 300 for the customer. The ATS 300 checks the database to determine if the submitted serial number corresponds to a valid tracking device and that it is not already associated with another customer. If the tracking device is available, then the user is prompted to fill in the required information about the asset in which the tracking device is to be installed. The tracking device is then associated with the customer profile and the information is saved in the database.

7. Tracking Service Provider Functions 565: A separate and unique "Customer Number" allows call centre staff (and other authorized tracking service provider staff) to access the web pages and data associated with a given customer. Though proper access level authorization, call centre staff arc allowed to facilitate customer requests received by telephone and to alter data on behalf of customers. Typically, customers calling in their requests to the call centre 370 would be required to provide some form of "Challenge Word". The Challenge Word may be stored in the database and would be required to authorize charges including additional service charges results from the direct delivery of services by call center staff. Of course additional Tracking Service Provider Specific Commands" (see above) such as Activate and Deactivate Device, Change Report Day, etc., would also be available to staff with the appropriate authorization.

In addition to the "Customer Login" 510 series of pages, there are four additional main series of pages as follows:

1. Police Login 570: If a user has reported the theft of an asset protected with a tracking device 310 to police, the user should advise the police that the tracking service provider can provide assistance to the police in locating the protected asset. The user should also provide the police with the toll free number for contacting the call center 370 and the Incident Report Number provided by the tracking service provider. Once the police contact the tracking service provider, call centre staff can provide locating services (e.g. via the "Locate" command) or tracking services (e.g. via the "Track Unite for 'x' Minutes" command) to the police over the telephone. Alternatively a temporary password can be given to the police by telephone so that they can log on to the tracking service provider's website, enter the Incident Report Number, perform locating and tracking functions, and receive maps and location data directly.

2. Open New Account 575: This page allows new customers that have not yet registered with the tracking service provider to establish and set up a new account. Users that select this option will be prompted to fill in all of the required information to establish an account with the tracking service provider. Once this process has been completed and the data written to the database, the new user is asked if they wish to configure an initial tracking device. If so, the new user is then prompted fur information required to activate the new device, as described above. The system 300 supports secure socket layer ("SSL") with 128 bit encryption to encrypt data exchanged between the customer and the servers 360 so that the customer can confidently and securely provide credit card and other data to the tracking service provider.

3. Contact Us 580: This page provides the user with contact information for the tracking service provider.

4. Privacy Statement 585 This page provides the user with the tracking service provider's privacy statement.

Figure 6A:
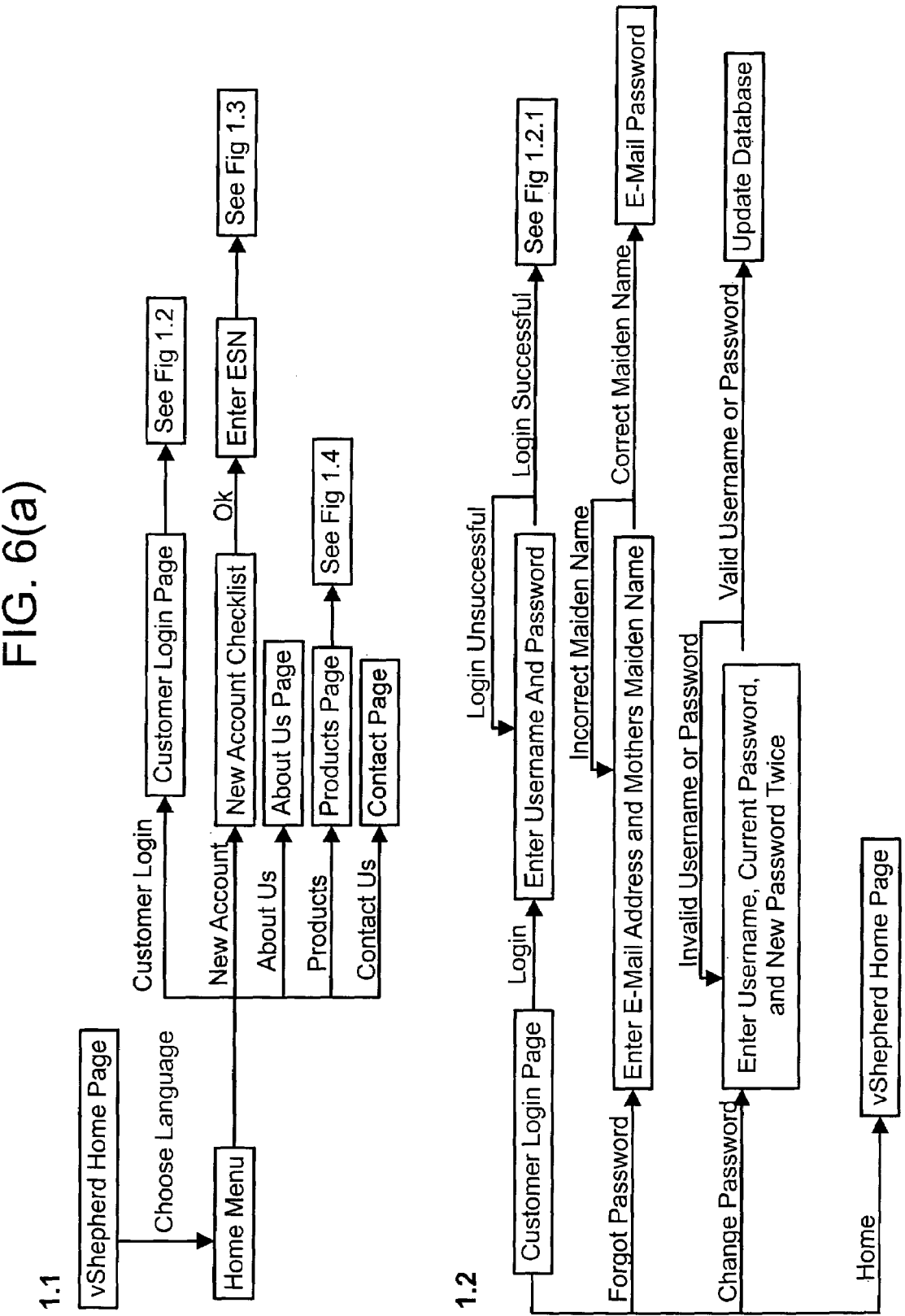
FIG. 6 is an exemplary web page flow chart in accordance with an alternate embodiment of the invention.
Figure 6B:
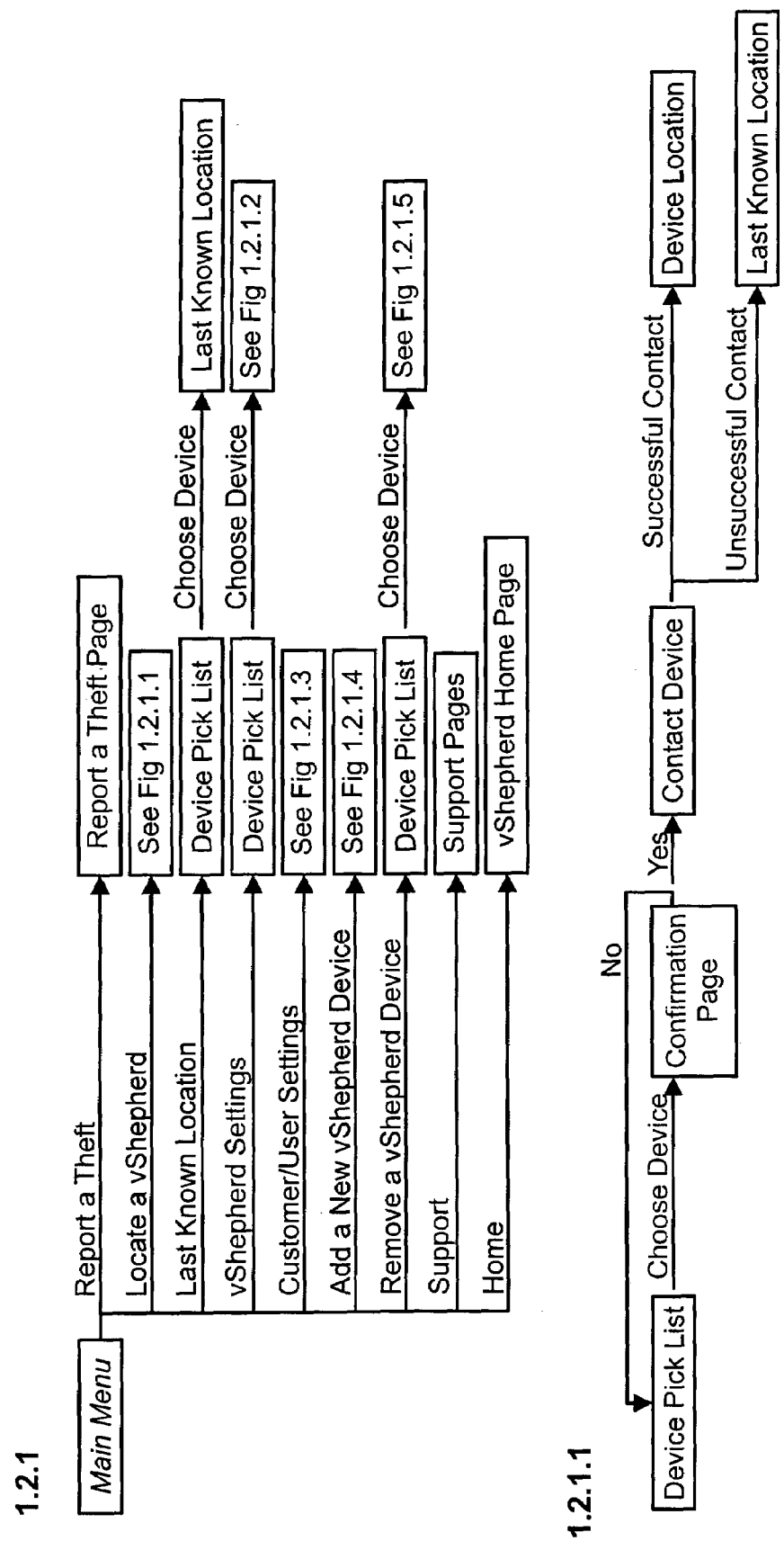
Figure 6E:
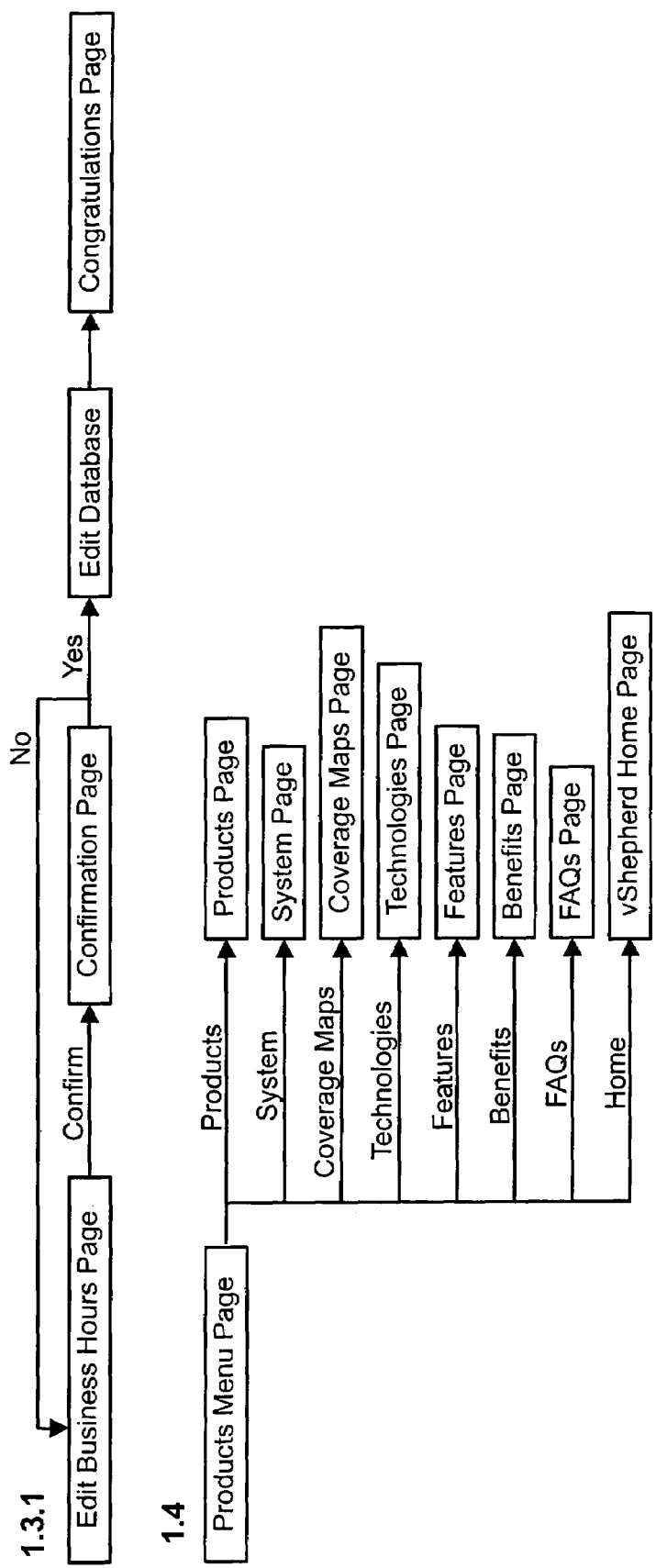
Figure 7A:
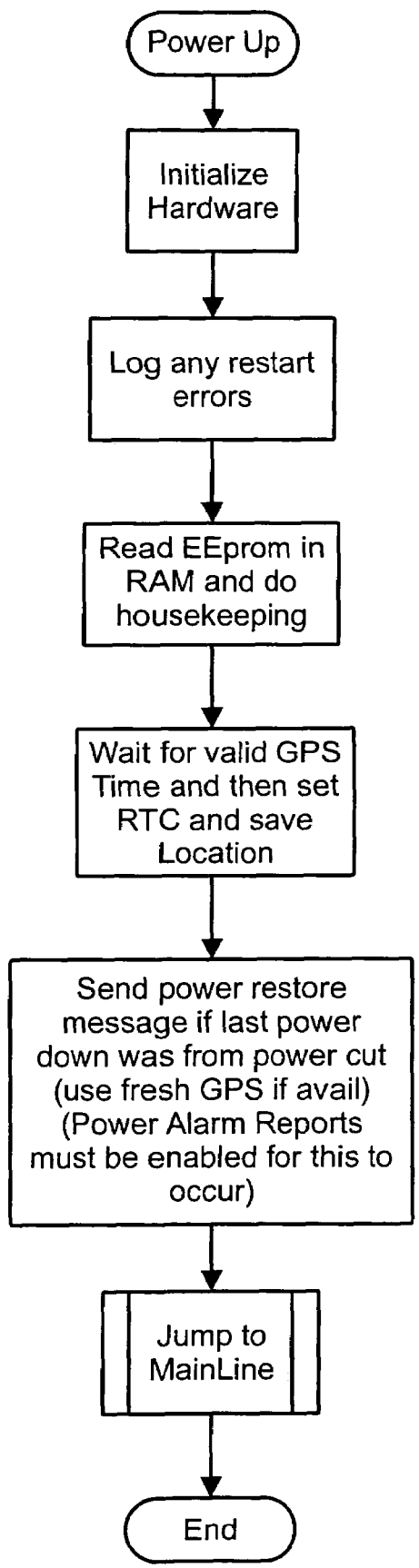
FIG. 7 is a flow chart illustrating an exemplary asset tracking device method in accordance with an embodiment of the invention; and, FIG. 8 is a flow chart illustrating an exemplary bridge server method in accordance with an embodiment of the invention.
Figure 7B:
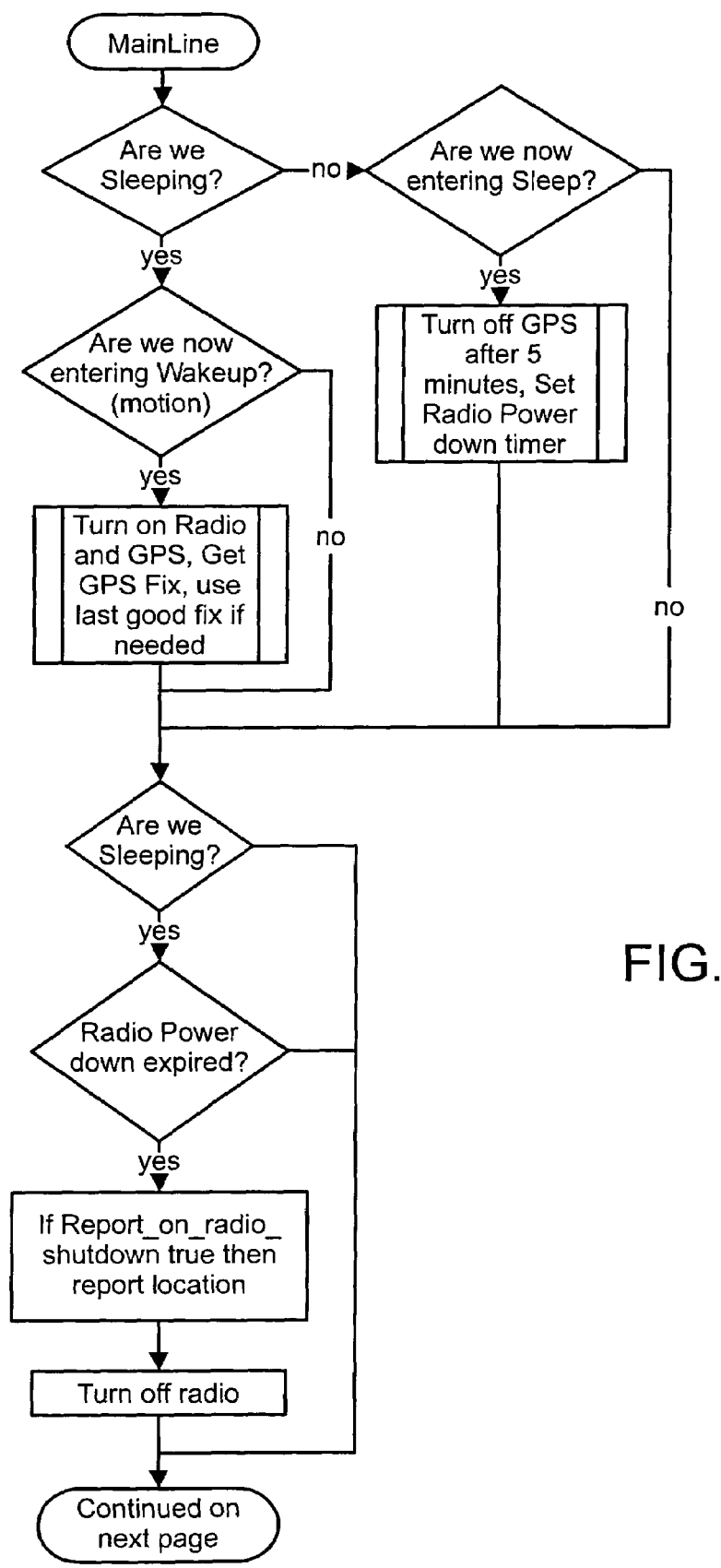
Figure 7C:
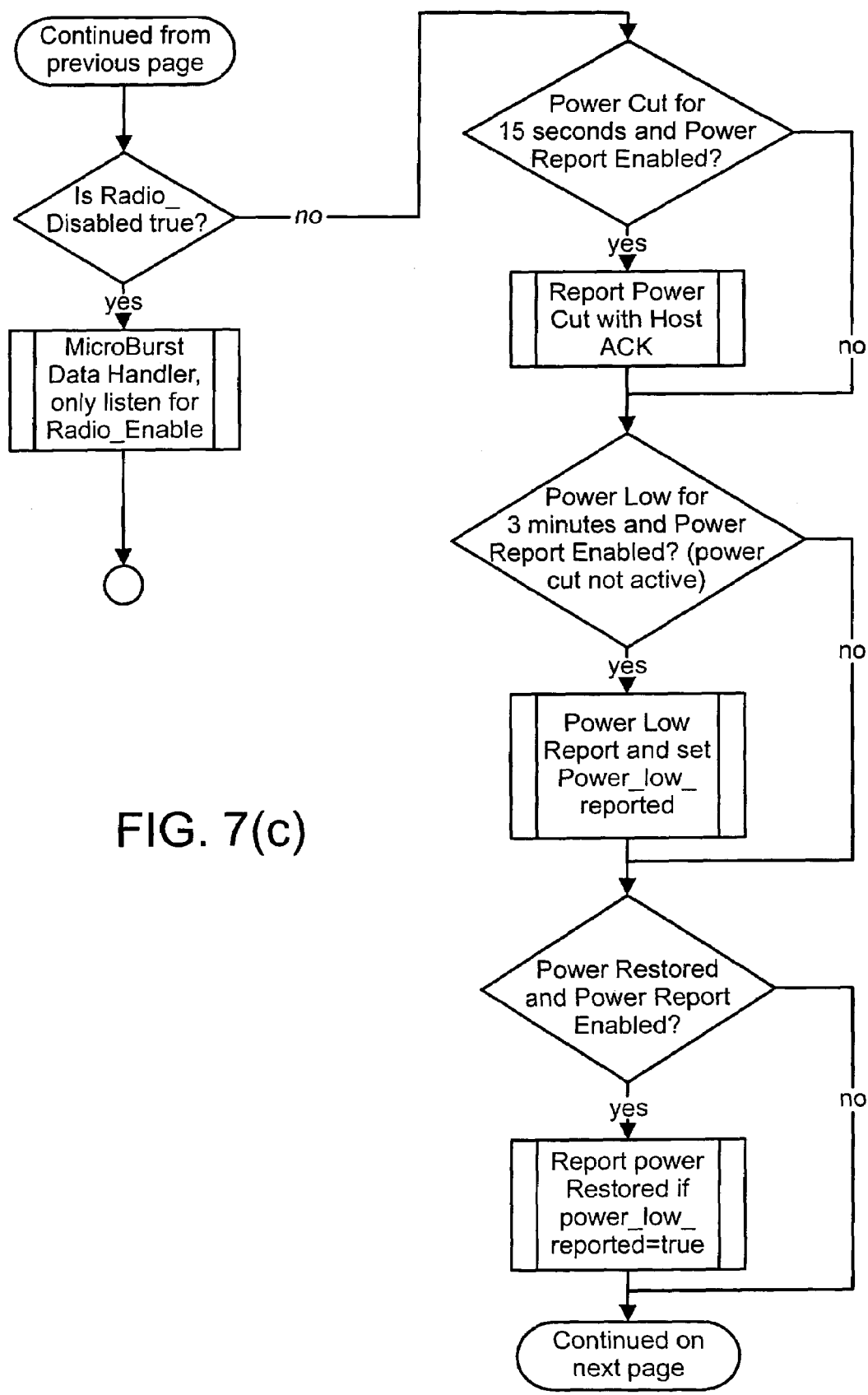
Figure 7D:
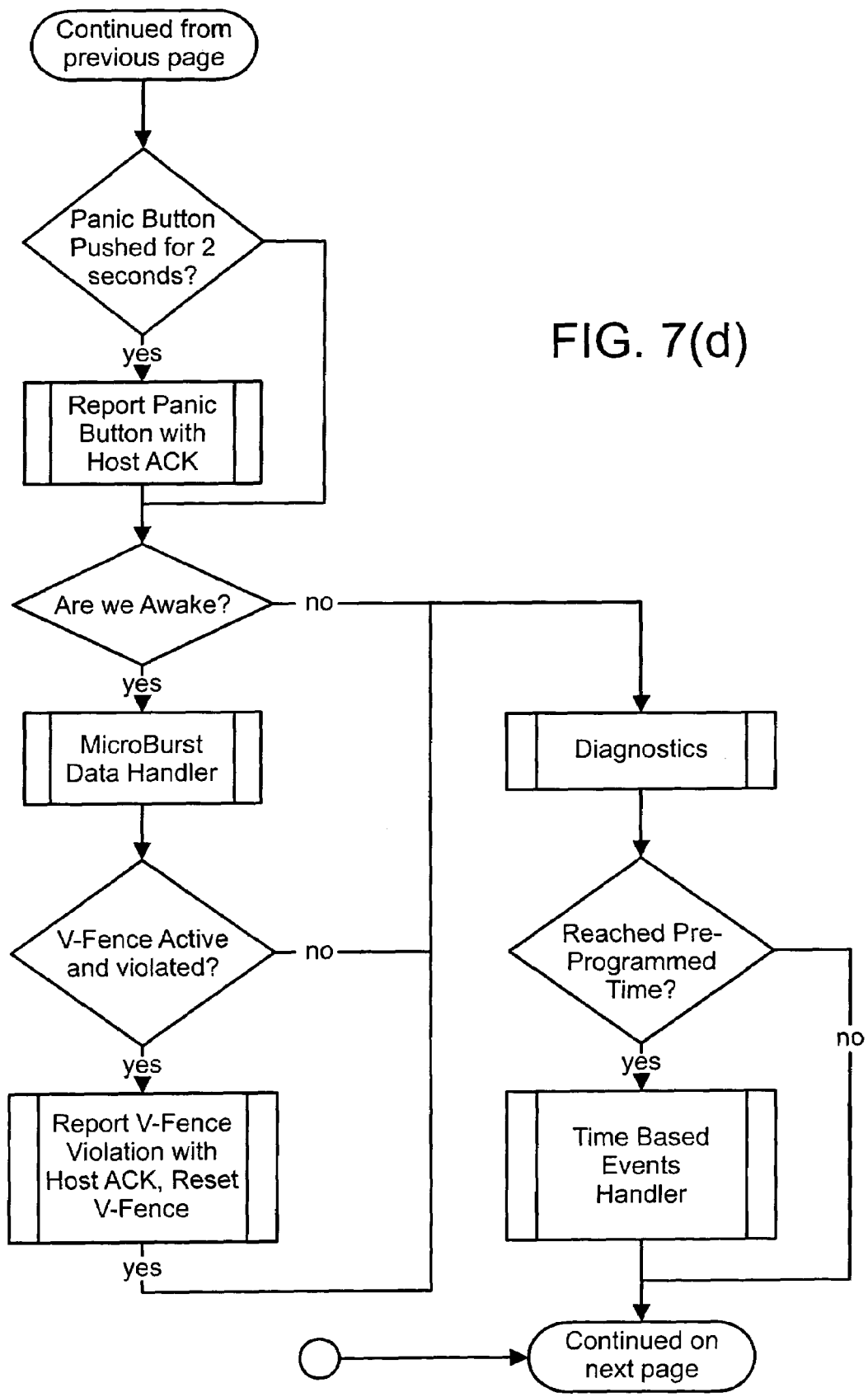
Figure 7E:
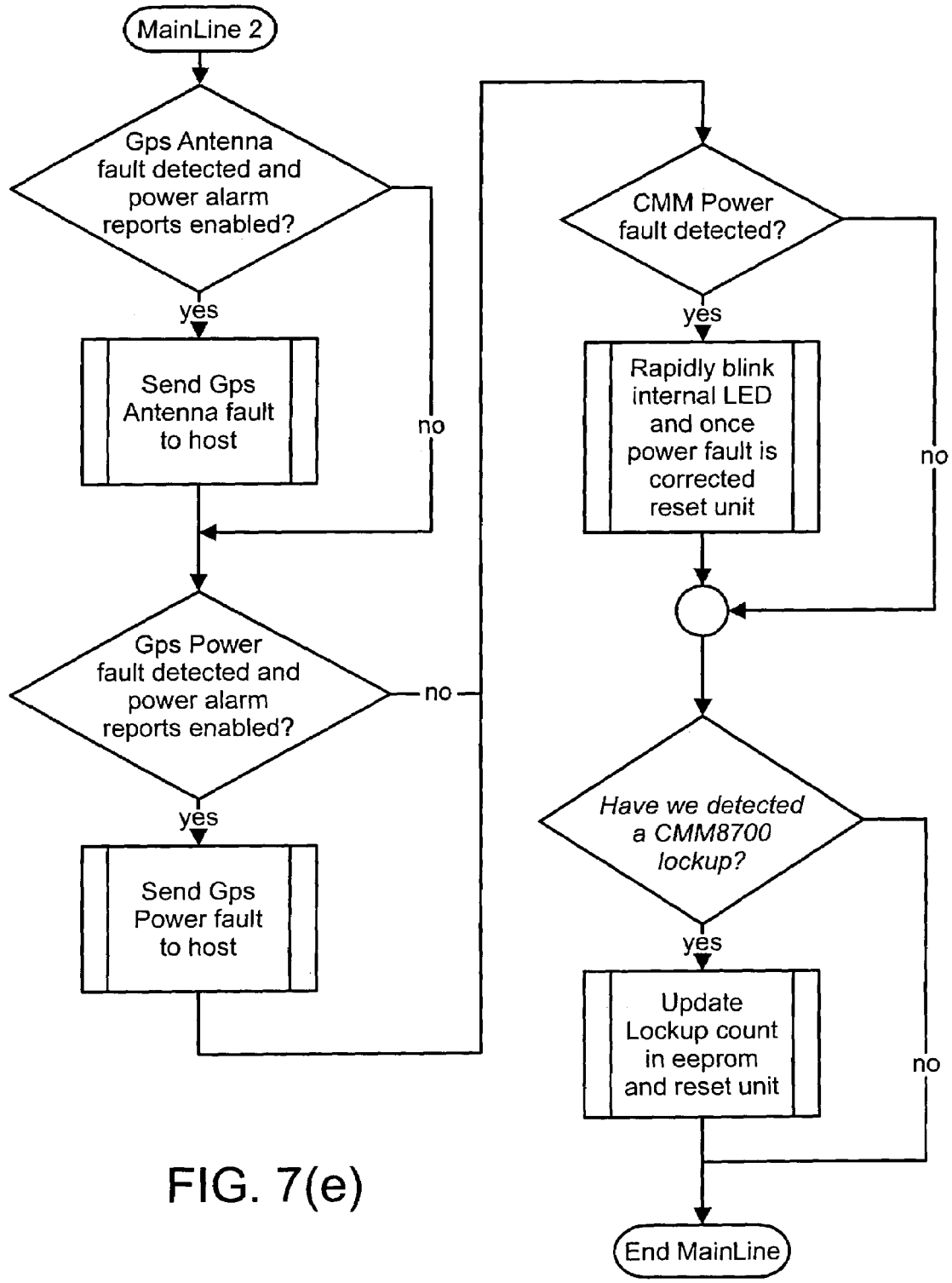
Figure 7F:
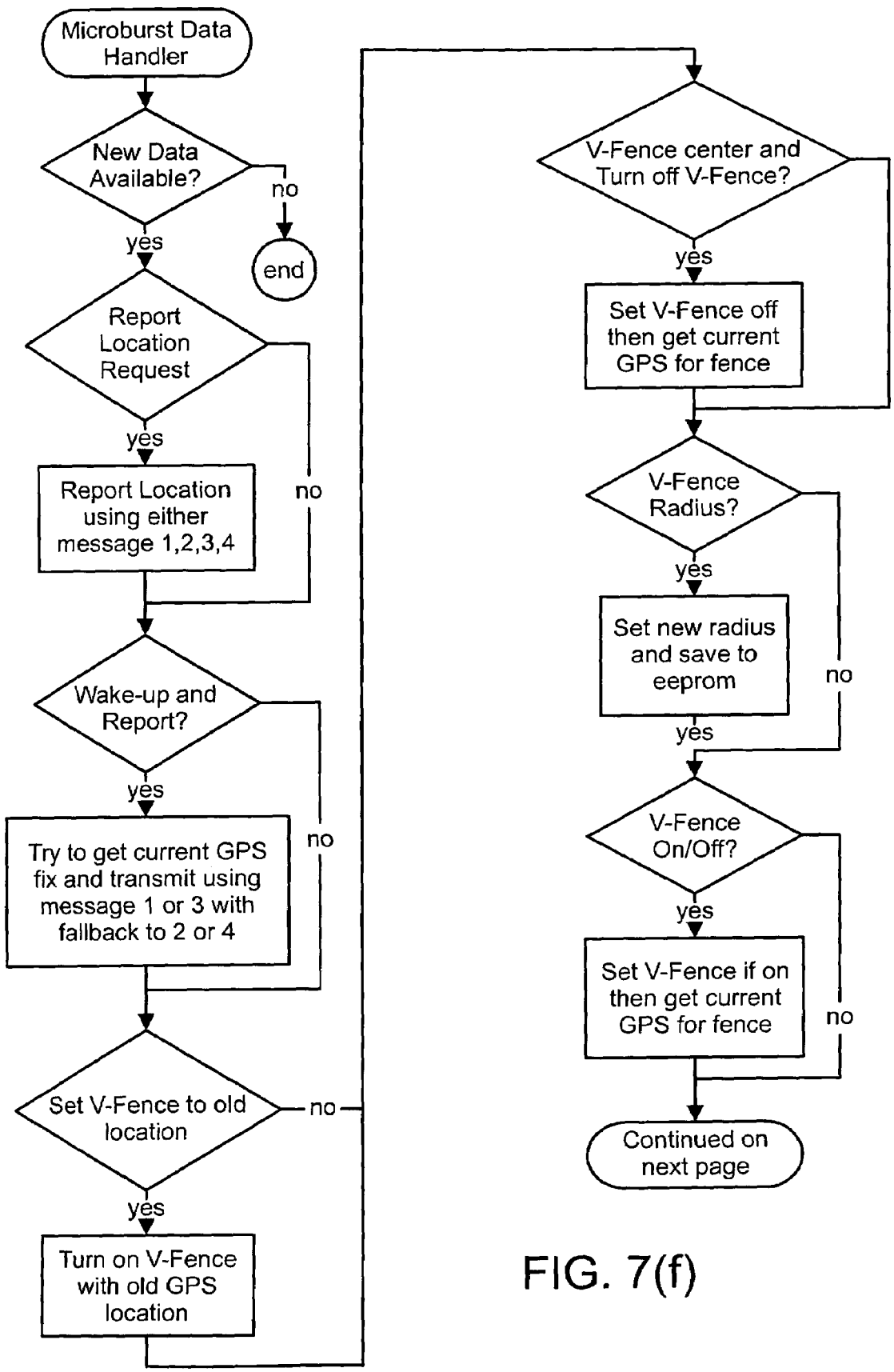
Figure 7G:
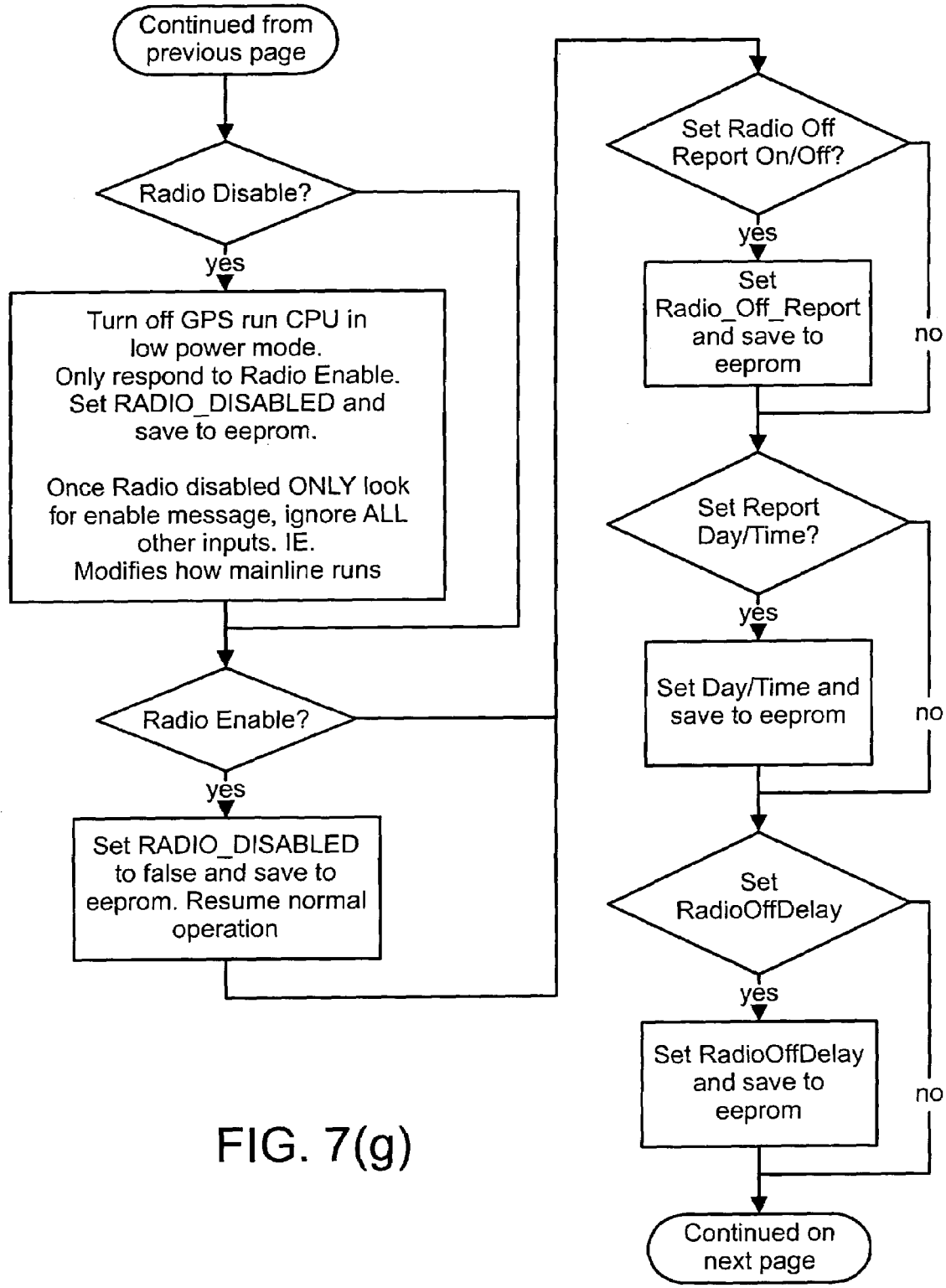
Figure 7H:
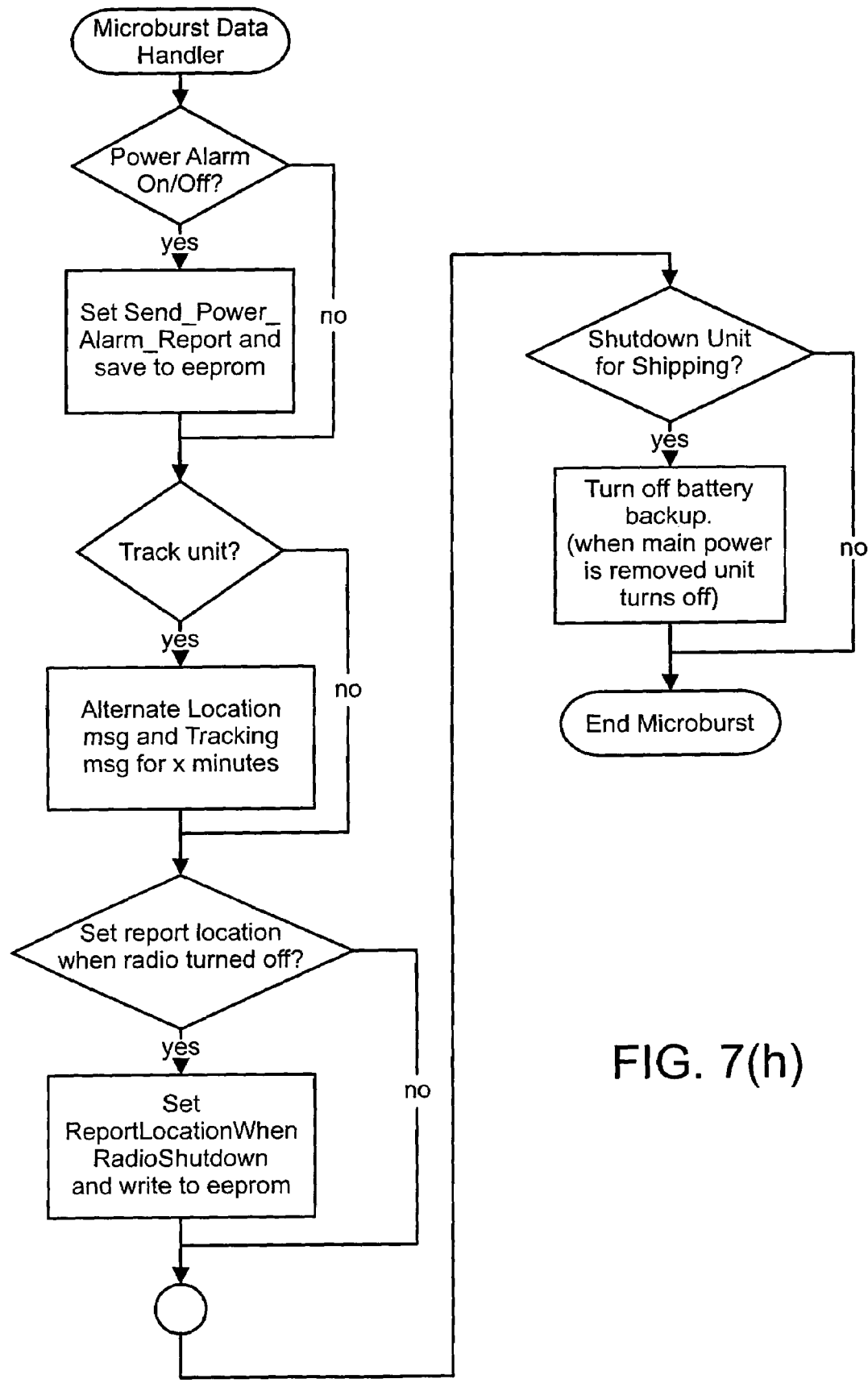
Figure 7I:
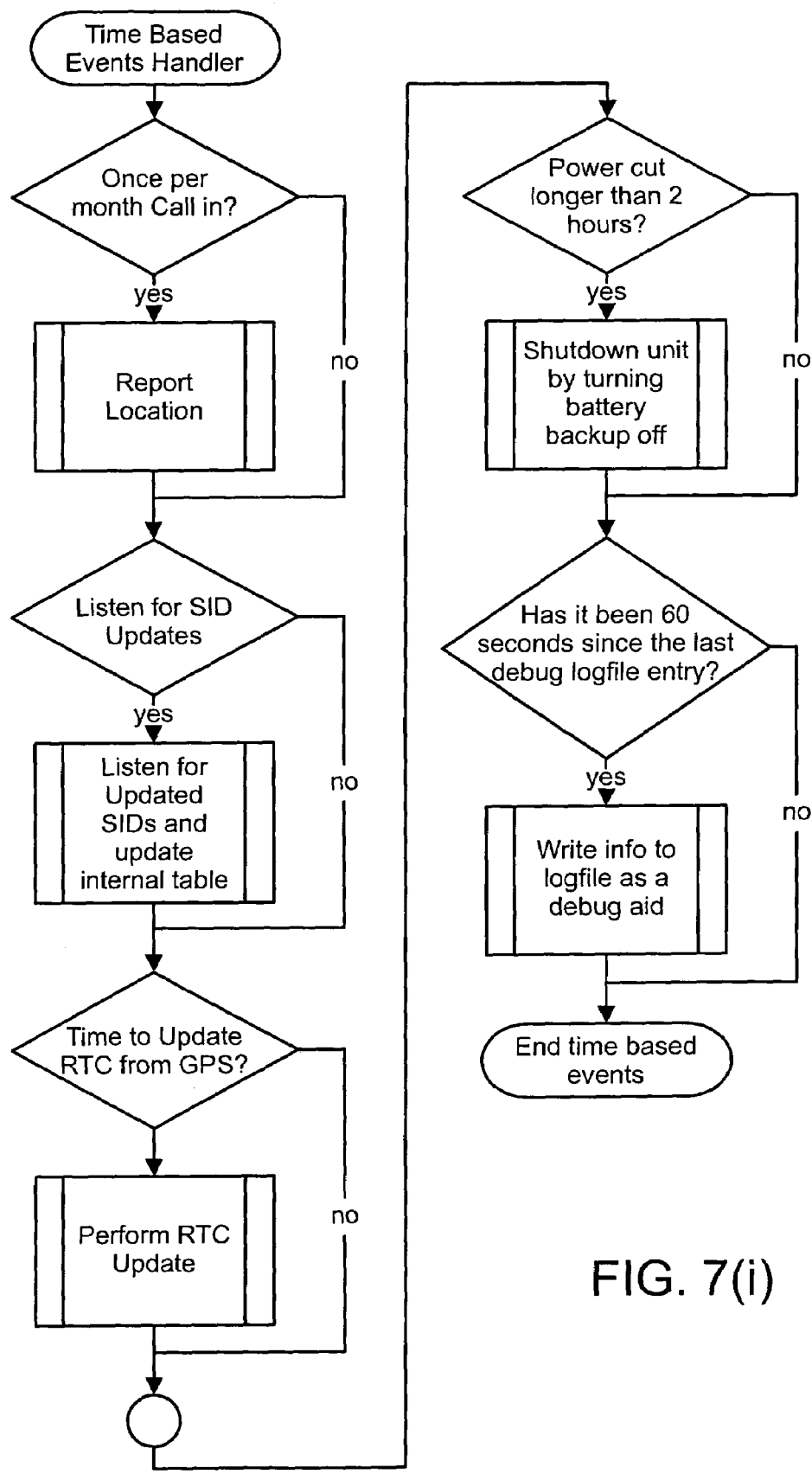
Figure 7J:
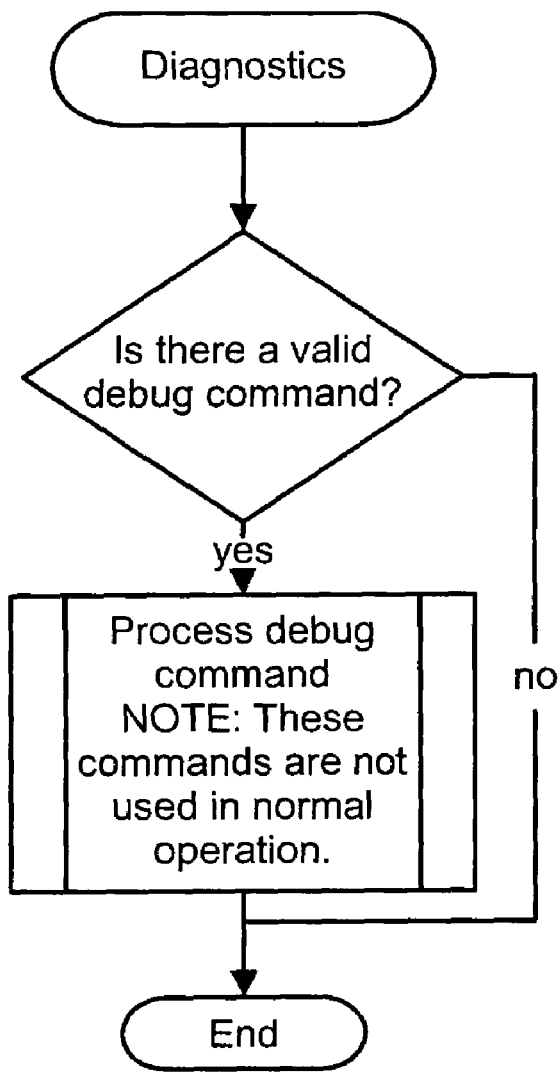

Referring to FIG. 6, there is shown an exemplary web page flow chart in accordance with an alternate embodiment of the invention.

Data Carrier Product. The sequences of instructions which when executed cause the method described herein to be performed by the asset tracking system 300 of FIG. 3 can be contained in a data carrier product according to an embodiment of the invention. This computer software product can be loaded into and run by the asset tracking system 300 of FIG. 3.

Computer Software Product. The sequences of instructions which when executed cause the method described herein to be performed by the asset tracking system 300 of FIG. 3 can be contained in a computer software product according to an embodiment of the invention. This computer software product can be loaded into and run by the asset tracking system 300 of FIG. 3.

Integrated Circuit Product. The sequences of instructions which when executed cause the method described herein to be performed by the asset tracking system 300 of FIG. 3 can be contained in an integrated circuit product including a coprocessor or memory according to an embodiment of the invention. This integrated circuit product can be installed in the asset tracking system 300 of FIG. 3.

Although preferred embodiments of the invention have been described herein, it will be understood by those skilled in the art that variations may be made thereto without departing from the spirit of the invention or the scope of the appended claims.

The embodiments of the invention in which an exclusive property or privilege is claimed are defined as follows:

1. A method of operating an asset tracking system comprising a tracking device management system and a tracking device, wherein the tracking device management system is comprised of a management system communication device, a management system communication interface and a tracking system server, wherein the tracking system server is comprised of a database for storing data pertaining to the asset tracking system and wherein the tracking device is comprised of a GPS receiver, a tracking device communication device and a microcontroller, the method comprising the following steps:
   (a) using the GPS receiver to obtain a plurality of GPS signals from GPS satellite transmitters in order to facilitate the determination of positioning coordinates of the tracking device;
   (b) processing the GPS signals with the microcontroller in order to produce a positioning message;
   (c) transmitting the positioning message from the tracking device to the tracking device management system through a tracking device communication link between the tracking device communication device and the management system communication device;
   (d) processing the positioning message with the tracking device management system to determine the positioning coordinates of the tracking device;
   (e) providing a customer communication link between a customer of the asset tracking system and the management system communication interface to enable the customer to communicate with the tracking device management system; and
   (f) configuring the tracking device through the customer communication link, wherein the tracking device configuring step is comprised of:
      (i) transmitting a command to the tracking device through the tracking device communication link via the tracking device management system;
      (ii) transmitting a confirmation that the tracking device has been configured from the tracking device to the tracking device management system through the tracking device communication link; and
      (iii) modifying the database to reflect the configuration of the tracking device after the confirmation has been received by the tracking device management system.

2. The method as claimed in claim 1 wherein the tracking device communication link is comprised of a telecommunication link between the tracking device communication device and the management system communication device.

3. The method as claimed in claim 2 wherein the tracking device communication link is comprised of a cellular telephone network.

4. The method as claimed in claim 2 wherein the tracking device communication link is comprised of a virtual carrier network.

5. The method as claimed in claim 2 wherein the tracking device communication link is comprised of a control channel associated with a cellular telephone network.

6. The method as claimed in claim 5 wherein the cellular telephone network is comprised of an AMPS cellular telephone network.

7. The method as claimed in claim 1, further comprising the following steps:
   (a) receiving an alarm signal at the tracking device;
   (b) processing the alarm signal with the microcontroller in order to produce an alarm message;
   (c) implementing an alarm message transmitting procedure comprised of the step of transmitting the alarm message from the tracking device to the tacking device management system through the tracking device communication link; and
   (d) processing the alarm message with the tracking device management system to produce an alarm indication.

8. The method as claimed in claim 7 wherein the tracking device communication link is comprised of a telecommunication link between the tracking device communication device and the management system communication device.

9. The method as claimed in claim 8 wherein the tracking device communication link is comprised of a cellular telephone network.

10. The method as claimed in claim 8 wherein the tracking device communication link is comprised of a virtual carrier network.

11. The method as claimed in claim 8 wherein the tracking device communication link is comprised of a control channel associated with a cellular telephone network.

12. The method as claimed in claim 11 wherein the cellular telephone network is comprised of an AMPS cellular telephone network.

13. The method as claimed in claim 7, further comprising the step of performing a login procedure in order to access the customer communication link.

14. The method as claimed in claim 13, wherein the login procedure establishes a plurality of different access levels for the customer communication link.

15. The method as claimed in claim 13, further comprising the step of receiving the positioning coordinates and the alarm indication at a customer terminal from the tracking device management system through the customer communication link.

16. The method as claimed in claim 1 wherein the customer communication link is comprised of a telecommunication link.

17. The method as claimed in claim 16 wherein the customer communication link is comprised of a telephone link.

18. The method as claimed in claim 16 wherein the customer communication link is comprised of a computer network.

19. The method as claimed in claim 18 wherein the management system communication interface is comprised of a tracking device management web interface.

20. The method as claimed in claim 19 wherein the tracking device management system is further comprised of a tracking device management website and wherein the tracking device management web interface is comprised of the tracking device management website.

21. The method as claimed in claim 1, further comprising the following steps:
   (a) receiving an alarm signal at the tracking device;
   (b) processing the alarm signal with the microcontroller in order to produce an alarm message; and
   (c) implementing an alarm message transmitting procedure comprised of the step of transmitting the alarm message from the tracking device to the tracking device management system through the tracking device communication link.

22. The method as claimed in claim 21, further comprising the step of transmitting an alarm message receive confirmation from the tracking device management system to the tracking device through the tracking device communication link in response to the transmission of the alarm message.

23. The method as claimed in claim 21 wherein the alarm message transmitting procedure is further comprised of the step of re-transmitting the alarm message to the tracking device management system through the tracking device communication link if an alarm message receipt confirmation is not received by the tracking device from the tracking device management system within a selected alarm message confirmation time.

24. The method as claimed in claim 21 wherein the alarm message transmitting procedure is further comprised of the following steps:
  (a) waiting for a selected alarm message confirmation time for receipt by the tracking device of an alarm message receipt confirmation from the tracking device management system;
  (b) re-transmitting the alarm message to the tracking device management system through the tracking device communication link if the alarm message receipt confirmation is not received by the tracking device within the alarm message confirmation time; and
  (c) repeating steps (a) and (b) until either the alarm message receipt confirmation has been received by the tracking device or the alarm message has been transmitted and re-transmitted a selected number of times.

25. The method as claimed in claim 24, further comprising the steps of waiting for a selected waiting period and implementing the alarm message transmitting procedure again if the alarm message receipt confirmation has not been received from the tracking device management system.

26. The method as claimed in claim 24, further comprising the step of repeating a cycle of waiting for a selected waiting period and implementing the alarm message transmitting procedure until the alarm message receipt confirmation is received from the tracking device management system.

27. The method as claimed in claim 1 wherein the asset tracking system is comprised of a plurality of tracking devices, further comprising the step of assigning two or more of the tracking devices to a group through the customer communication link so that the tracking device management system can communicate collectively with the group of the tracking devices.

28. The method as claimed in claim 1, further comprising the step of storing data pertaining to the GPS signals in the database.

29. The method as claimed in claim 28, further comprising the step of storing data pertaining to a last known location of the tracking device in the database.

30. The method as claimed in claim 29 wherein the positioning message processing step is comprised of processing the data pertaining to the last known location of the tracking device if the tracking device management system is unable to obtain current location information from the tracking device.

31. The method as claimed in claim 1, further comprising the following steps:

(a) entering the tracking device into a power save mode in which the tracking device communication device is inoperative; and
  (b) entering the tracking device into an awake period while the tracking device is in the power save mode in which the tracking device communication device is operative.

32. The method as claimed in claim 31 wherein the step of entering the tracking device into the awake period is performed according to a selected schedule.

33. A method of operating an asset tracking system comprising a tracking device management system and a tracking device, wherein the tracking device management system is comprised of a management system communication device and wherein the tracking device is comprised of a GPS receiver, a tracking device communication device and a microcontroller, comprising the following steps:
  (a) using the GPS receiver to obtain a plurality of GPS signals from GPS satellite transmitters in order to facilitate the determination of positioning coordinates of the tracking device;
  (b) processing the GPS signals with the microcontroller in order to produce a positioning message;
  (c) transmitting the positioning message from the tracking device to the tracking device management system through a tracking device communication link between the tracking device communication device and the management system communication device;
  (d) processing the positioning message with the tracking device management system to determine the positioning coordinates of the tracking device;
  (e) receiving an alarm signal at the tracking device;
  (f) processing the alarm signal with the microcontroller in order to produce and alarm message; and
  (g) implementing an alarm message transmitting procedure comprised of the steps of transmitting the alarm message from the tracking device to the tracking device management system through the tracking device communication link and re-transmitting the alarm message to the tracking device management system through the tracking device communication link if an alarm message receipt confirmation is not received by the tracking device from the tracking device management system within a selected alarm message confirmation time.

34. The method as claimed in claim 33, further comprising the step of processing the alarm message with the tracking device management system to produce an alarm indication.

35. A method of operating an asset tracking system comprising a tracking device management system and a tracking device, wherein the tracking device management system is comprised of a management system communication device and wherein the tracking device is comprised of a GPS receiver, a tracking device communication device and a microcontroller, comprising the following steps:
  (a) using the GPS receiver to obtain a plurality of GPS signals from GPS satellite transmitters in order to facilitate the determination of positioning coordinates of the tracking device;
  (b) processing the GPS signals with the microcontroller in order to produce a positioning message;
  (c) transmitting the positioning message from the tracking device to the tracking device management system through a tracking device communication link between the tracking device communication device and the management system communication device;

(d) processing the positioning message with the tracking device management system to determine the positioning coordinates of the tracking device;
(e) receiving an alarm signal at the tracking device;
(f) processing the alarm signal with the microcontroller in order to produce an alarm message; and
(g) implementing an alarm message transmitting procedure comprised of the steps of:
  (i) transmitting the alarm message from the tracking device to the tracking device management system through the tracking device communication link;
  (ii) waiting for a selected alarm message confirmation time for receipt by the tracking device of an alarm message receipt confirmation from the tracking device management system;
  (iii) re-transmitting the alarm message to the tracking device management system through the tracking device communication link if the alarm message receipt confirmation is not received by the tracking device within the alarm message confirmation time; and
  (iv) repeating steps (ii) and (iii) until either the alarm message receipt confirmation has been received by the tracking device or the alarm message has been transmitted and re-transmitted a selected number of times.

36. The method as claimed in claim 35, further comprising the step or processing the alarm message with the tracking device management system to produce an alarm indication.

37. The method as claimed in claim 35, further comprising the steps of waiting for a selected waiting period and implementing the alarm message transmitting procedure again if the alarm message receipt confirmation has not been received from the tracking device management system.

38. The method as claimed in claim 35, further comprising the step of repeating a cycle of waiting for a selected waiting period and implementing the alarm message transmitting procedure until the alarm message receipt confirmation is received from the tracking device management system.

* * * * *